United States Patent [19]

Takeuchi et al.

[11] Patent Number: 5,690,289
[45] Date of Patent: Nov. 25, 1997

[54] HANDLE MOUNTING STRUCTURE IN FISHING REEL

[75] Inventors: Shinji Takeuchi; Eiji Shinohara, both of Tokyo, Japan

[73] Assignee: Daiwa Seiko, Inc., Tokyo, Japan

[21] Appl. No.: 635,215

[22] Filed: Apr. 17, 1996

Related U.S. Application Data

[63] Continuation of Ser. No. 301,885, Sep. 7, 1994, abandoned.

[30] Foreign Application Priority Data

| Sep. 8, 1993 | [JP] | Japan | 5-053615 U |
| Sep. 24, 1993 | [JP] | Japan | 5-056550 U |
| Sep. 24, 1993 | [JP] | Japan | 5-056551 U |
| Oct. 28, 1993 | [JP] | Japan | 5-062768 U |

[51] Int. Cl.⁶ .................................................. A01K 89/06
[52] U.S. Cl. .................................................. 242/282; 403/370
[58] Field of Search ........................... 242/282; 403/370, 403/371, 368, 296, 297, 289

[56] References Cited

U.S. PATENT DOCUMENTS

| 612,489 | 10/1898 | Dean | 403/370 |
| 1,493,063 | 5/1924 | Blaine | 403/370 |
| 2,505,648 | 4/1950 | Pawsat | 403/370 X |
| 3,752,430 | 8/1973 | Kenyon et al. | 403/370 X |
| 4,152,086 | 5/1979 | Achenbach et al. | 403/297 X |
| 4,274,301 | 6/1981 | Katayama | 403/370 X |
| 4,464,076 | 8/1984 | Leibhard | 403/370 X |
| 5,201,242 | 4/1993 | Chi | 403/370 X |
| 5,411,232 | 5/1995 | Hufford | 403/370 X |

FOREIGN PATENT DOCUMENTS

| 170526 | 8/1951 | Austria . | |
| 747969 | 4/1933 | France | 403/289 |
| 879842 | 12/1942 | France | 403/297 |
| 2543210 | 4/1976 | Germany . | |
| 3014446 | 10/1980 | Germany . | |
| 3340937 | 5/1985 | Germany . | |
| 4126191 | 2/1992 | Germany . | |
| 4127595 | 2/1992 | Germany . | |
| 60-777 | 1/1985 | Japan . | |
| 315240 | 7/1929 | United Kingdom | 403/289 |
| 778607 | 7/1957 | United Kingdom . | |

OTHER PUBLICATIONS

Patent Abstracts of Japan; unexamined applications; vol. 7, No. 95; 21 Apr. 1983; p. 154 M 209.

Primary Examiner—Daniel P. Stodola
Assistant Examiner—Gregory J. Strimbu
Attorney, Agent, or Firm—Longacre & White

[57] ABSTRACT

A handle mounting structure in a fishing reel, which spreads open and deforms a collar by means of the taper action of a tapered engaging surface formed in the end portion of a handle shaft to thereby be sure to prevent the handle shaft from being loosened and clattered in the rotational direction thereof. The handle mounting structure includes: a drive shaft having a drive gear and a through-hole; a handle shaft to which a handle is fixed and which is non-rotatably fitted into the through-hole of the drive shaft; a tapered engaging surface formed on an end portion of the handle shaft; a collar deformable radially outwardly and fitted into the through-hole of the drive shaft so that one end of the collar is confronted with the tapered engaging surface; and a threaded member engageable with the handle shaft. The collar is pressed axially against the tapered engaging surface by the threaded member so that the collar is deformed and spread, whereby the collar is brought into pressure-contact with an inner surface of the through-hole of the drive shaft.

11 Claims, 15 Drawing Sheets

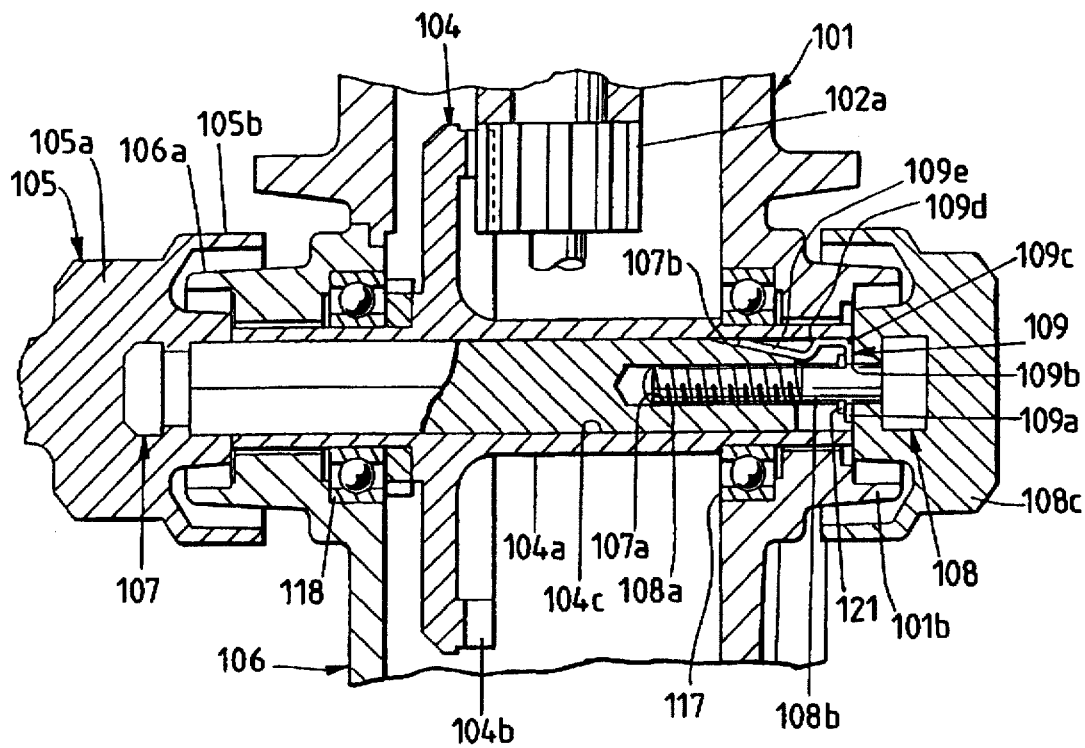
FIG. 9
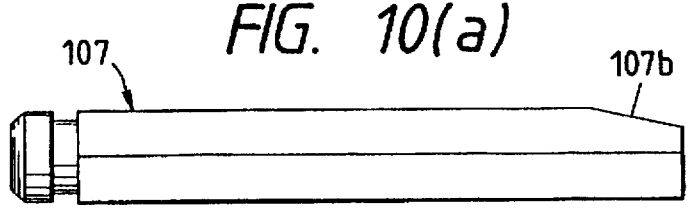
FIG. 10(a)    FIG. 10(b)
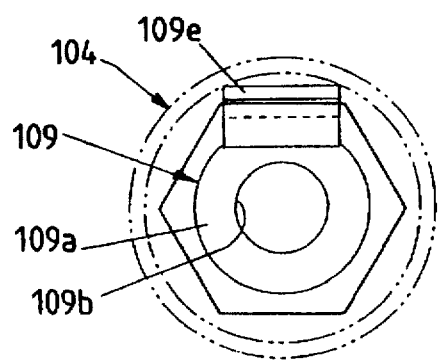
FIG. 11(a)    FIG. 11(b)
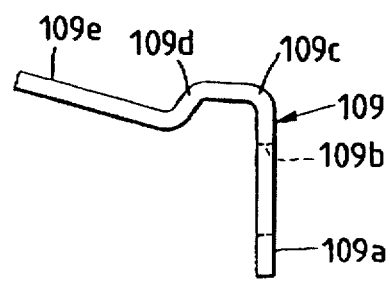

HANDLE MOUNTING STRUCTURE IN FISHING REEL

This is a continuation of application Ser. No. 08/301,885, filed Sep. 7, 1994, which was abandoned upon the filing hereof.

BACKGROUND OF THE INVENTION

The present invention relates to a handle mounting structure in a fishing reel whereby the operation of a handle for taking up a fishing line round a spool is improved.

Conventionally, in a fishing reel, as a method of preventing the loosening of a handle shaft non-rotatably fitted into a drive shaft having a drive gear, there is known such a method as disclosed in Japanese Utility Model Publication No. Sho. 60-777, in which there is formed a split groove in the end portion of a handle shaft including an internal thread, an external thread having a tapered portion is threadedly engaged into the split groove, the split groove is spread open and deformed outwardly in the diameter direction thereof by means of the tapered portion of the external thread, and the end portion of the handle shaft is pressed against the inner surface of the drive shaft, thereby preventing the loosening of the handle shaft in the rotational direction thereof.

However, in this method, since the two sides of the split groove portion of the handle shaft end portion are deformed outwardly by the tapered portion of the tapered external thread, the internal thread portion of the end portion of the handle shaft is also affected by the outward deformation of the split groove and thus the threaded engagement of the internal thread portion with the external thread is loosened, which easily makes the threaded engagement completely ineffective and gives rise to the poor durability of the handle shaft when it is mounted and removed.

Also, since the split groove is deformed while the handle shaft is tightened by the tapered portion of the external thread, the tapered portion can be easily damaged due to the spiral ridges of the internal thread portion in the end portion of the handle shaft, so that a stable deforming action due to the contact of the tapered portion cannot be provided.

In the above-mentioned conventional handle mounting structure, since the two sides of the split groove portion formed in the end portion of the handle shaft are deformed outwardly, the internal thread of the end portion of the handle shaft is also affected by the outward deformation of the split groove portion to loosen the threaded engagement with respect to the external thread. This can easily make the threaded engagement quite useless and can give rise to the poor durability of the handle shaft when it is mounted and removed repeatedly. At the same time, the tapered portion can be damaged due to the spiral ridges of the internal thread in the end portion of the handle shaft, and thus it is impossible to provide a stable deforming action due to the contact of the tapered surface.

SUMMARY OF THE INVENTION

The present invention aims at eliminating the above drawbacks found in the conventional handle mounting structure. Accordingly, it is an object of the present invention to provide a handle mounting structure in a fishing reel, which allows a handle shaft to be surely fitted in a cylindrical drive shaft while effectively preventing the unpleasant loosening or clattering of the handle shaft relative to the cylindrical drive shaft.

Another object of the present invention is to provide a handle mounting structure in a fishing reel in which a tapered engaging surface is formed in the end portion of a handle shaft, one side of a collar is disposed opposed to the tapered engaging surface, and the collar is spread open and deformed by means of the taper action of the tapered engaging surface, thereby preventing the handle shaft from being loosened or clattered in the rotational direction thereof in a stable and positive manner.

Yet another object of the present invention is to provide a handle mounting structure in a fishing reel, in which a tapered engaging surface is formed in the end portion of a handle shaft, and the end portion of a securing member disposed at the side of a threaded member threadedly engageable with the handle shaft is abutted against and engaged with the tapered engaging surface, thereby making sure to stably prevent the handle shaft from loosening in the rotational direction thereof.

Further another object of the present invention is to provide a handle mounting structure in a fishing reel in which a securing member is deformed outwardly in the diameter direction thereof to thereby prevent the handle shaft from being loosened in the rotational direction thereof stably and positively.

Still another object of the present invention is to provide a handle mounting structure in a fishing reel, in which a handle shaft is diametrically displaced by utilizing guide effect of slope surfaces in order to surely prevent the clattering of the handle shaft relative to the cylindrical drive shaft.

In order to attain the above-noted and other objects, the present invention provides the handle mounting structure in a fishing reel, in which a handle shaft with a handle mounted thereto is fitted into a drive shaft having a drive gear in a rotation preventive manner, a tapered engaging surface is formed in the end portion of the handle shaft, a collar deformable outwardly in the diameter direction thereof is fitted into the drive shaft such that one side of the collar is disposed opposed to the tapered engaging surface formed in the end portion of the handle shaft, the collar is pressed in the axial direction thereof by a threaded member threadedly engageable with the handle shaft, and the collar is spread open and deformed outwardly in the diameter direction thereof by means of the taper action of the tapered engaging surface, thereby pressing the collar against the inner surface of the drive shaft.

The present invention further provides a handle mounting structure in a fishing reel, in which a handle shaft with a handle mounted thereto is fitted into a drive shaft having a drive gear in a rotation preventive manner (that is, in such a manner that the handle shaft is prevented against rotation), a tapered engaging surface is formed in the end portion of the handle shaft, and the securing end portion of a securing member disposed at the side of a threaded member threadedly engageable with the handle shaft is inserted and engaged between the tapered engaging surface and the inner surface of the drive shaft.

The present invention further provides a handle mounting structure in a fishing reel, in which a handle shaft with a handle mounted thereto is fitted into a drive shaft having a drive gear in a rotation preventive manner, a threaded hole and an insertion hole in communication with the threaded hole are formed in the end portion of the handle shaft, a securing member deformable outwardly in the diameter direction thereof is fitted with the outer periphery of the handle shaft end portion, projection portions are provided in the securing member and are fitted into the insertion hole, and the projection portions are pressed by a tapered engaging surface formed in the leading end portion of a threaded member threadedly engageable with the handle shaft to deform the securing member outwardly in the diameter direction thereof, thereby pressing the securing member against the inner surface of the drive shaft.

The present invention further provides a handle mounting structure in a fishing reel, in which a handle shaft of a handle member is non-rotatably fitted into a drive shaft having a drive gear, one of the end portions of the drive shaft and the handle member is formed with a slope surface whereas the other thereof is formed with an engagement portion, and a longitudinally depressing force is effected on the slope surface and the engagement portion by tightening a threaded member threadingly engaged with the handle shaft, so that the handle shaft non-rotatably fitted in the drive shaft is diametrically displaced through the guiding effect of the slope surface and the handle shaft is brought into pressure-contact with the inner periphery of the drive shaft.

BRIEF DESCRIPTION OF THE DRAWINGS

FIG. 6(a) is a sectional side view of a drive shaft and a collar; and FIG. 6(b) is a sectional plan view of the drive shaft and collar.

FIG. 9 is an enlarged sectional plan view of the main portions of a handle employed in the third embodiment.

FIG. 10(a) is a plan view of a handle shaft employed in the third embodiment, and FIG. 10(b) is a side view of the end portion of the handle shaft.

FIG. 11(a) is an enlarged front view of a securing member employed in the third embodiment, and FIG. 11(b) is an enlarged side view of the securing member.

FIG. 20(a) is a plan view of the securing member; and, FIG. 20(b) is a front view of the securing member.

DETAILED DESCRIPTION OF THE PREFERRED EMBODIMENTS

Figure 1:
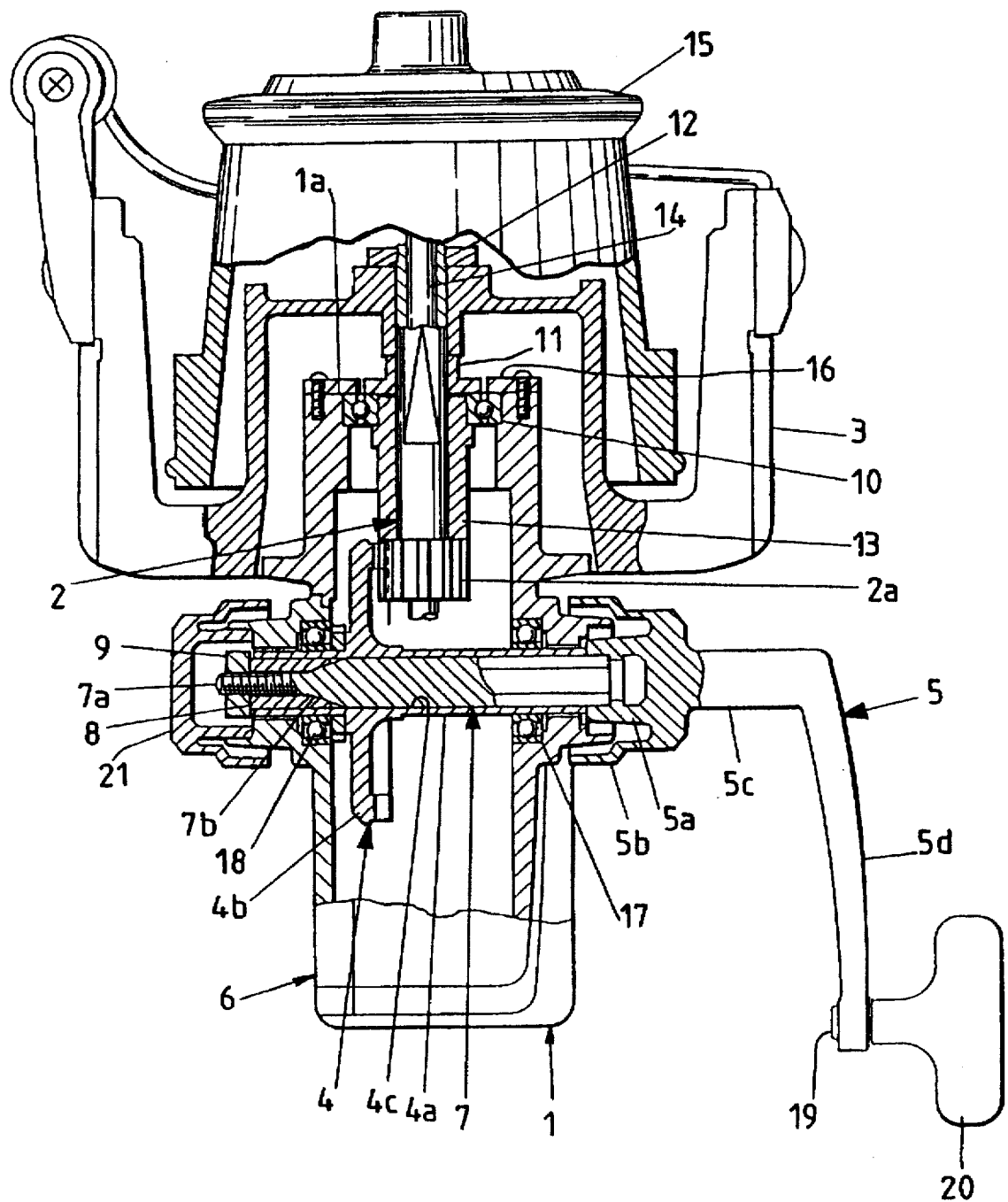
FIG. 1 is a sectional plan view of the main portions of a spinning reel for fishing to which a first embodiment of the invention is applied.

Preferred embodiments of the present invention will be described with reference to the accompanying drawings.

FIGS. 1 to 4 show a handle mounting structure according to a first embodiment of the present invention. In these drawings, a spinning reel for fishing is employed as a fishing reel.

The spinning reel for fishing includes a reel main body 1. A collar 11 with a flange is fitted with the outer periphery of a cylindrical drive shaft 2 projected forwardly from a bearing 10 which is provided in the front portion 1a of the reel main body 1. A rotor 3 is non-rotatably fitted with the cylindrical drive shaft 2 forwardly of the collar 11 and is fixed in place by a nut 12.

The rotor 3 is supported in such a manner that it can be rotated in linking with the rotation of a handle 5 through a drive gear 4 and a cylindrical drive shaft 4a of a winding drive mechanism in mesh with a pinion 2a provided in the drive shaft 2.

A collar 13 is fitted with the portion of the outer periphery of the drive shaft 2 existing in front of the pinion 2a.

A spool 15 is supported in the leading end portion of a spool shaft 14 which is fitted into the cylindrical drive shaft 2 and is projected out therefrom, and the spool 15 can be reciprocated back and forth in linking with the rotation of the handle 5.

The bearing 10 is prevented against removal by a stop plate 16.

The drive gear 4 comprises a cylindrical drive shaft 4a and a gear 4b, and the cylindrical drive shaft 4a is supported by a bearing 17 provided inside the side portion of the reel main body and by a bearing 18 provided inside a cover member 6.

The handle mounting structure is arranged such that a through hole 4c of the cylindrical drive shaft 4a is so formed as to have a polygonal section, a handle shaft 7 fixed to the handle 5 is fitted into the through hole 4c in a rotation preventive manner, and a collar 8 is inserted into the through hole 4c.

The handle 5 includes a mounting portion 5a, a cover portion 5b, a base portion 5c and an arm 5d which are all formed integrally with one another.

One side of the handle shaft 7 is fixed to the central portion of the mounting portion 5a.

A shaft 19 is fixed to the arm 5d and an operation knob 20 is supported rotatably on the arm 5d through the shaft 19.

The handle shaft 7 includes on the other side thereof an external thread 7a and a portion of the same side of the handle shaft 7 is also formed in a conical shape to thereby provide a tapered engaging surface 7b.

A threaded member 9 consisting of a nut can be threadedly engaged with the external thread 7a.

Figure 2:
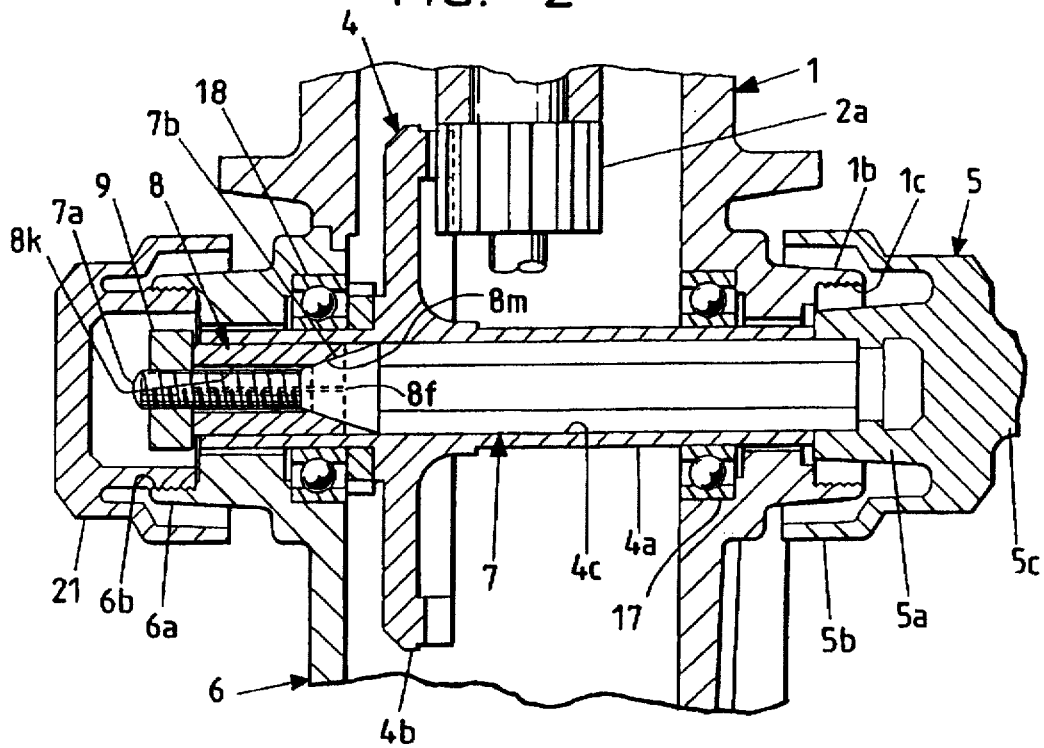
FIG. 2 is an enlarged sectional plan view of the main portions of a handle employed in the first embodiment.
Figure 3A:
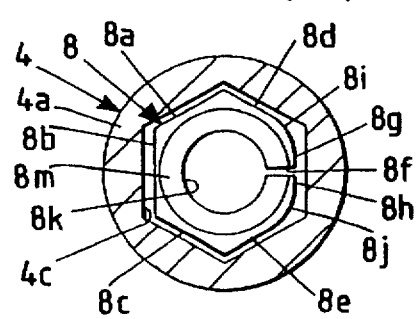
FIG. 3(a) is a sectional side view of a drive shaft and a collar respectively employed in the first embodiment.
Figure 3B:
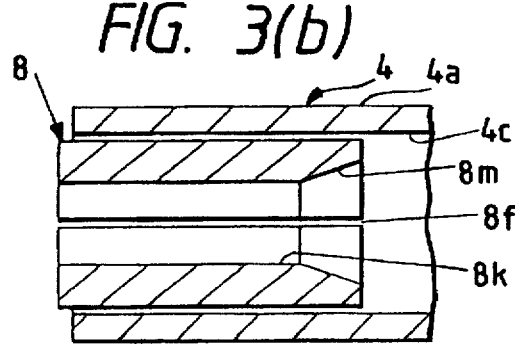
FIG. 3(b) is a sectional plan view of the drive shaft and collar.

The collar 8 is structured, as can be seen from FIGS. 1 to 3, such that the outer shape has a polygonal section with a diameter smaller than the inside diameter of the through hole 4c in the cylindrical drive shaft 4a and includes outer surfaces 8a, 8b, 8c, 8d, 8e, outer surfaces 8g and 8h divided by a slit 8f, and chamfered curved surfaces 8i and 8j.

Further, the collar 8 includes a through hole 8k in the central portion thereof and one end portion of the collar 8 is formed in a conical shape to thereby provide a tapered surface 8m.

The collar 8 is structured such that the outer shape thereof can be deformed outwardly in the diameter direction by the slit 8f.

In the respective outer sides of the side portions of the reel main body 1 and cover member 6, there are formed cylindrical portions 1b and 6a with the axis of the cylindrical drive shaft 4a as the center thereof.

A cover 21 is threadedly engaged with a threaded portion 6b of the cover member 6 in such a manner that the cover 21 can be freely mounted and removed.

When the handle 5 is mounted as a left handle, the cover 21 is threadedly engaged with a threaded portion 1c of the reel main body 1 in a freely removable manner.

When the handle shaft 7 and collar 8 are inserted into the through hole 4c of the cylindrical drive shaft 4a of the drive gear 4, the tapered surface 8m of the collar 8 is inserted such that it is opposed to the tapered engaging surface 7b of the handle shaft 7, and the threaded member 9 consisting of a nut is threadedly engaged with the external thread 7a of the handle shaft 7.

Figure 4:
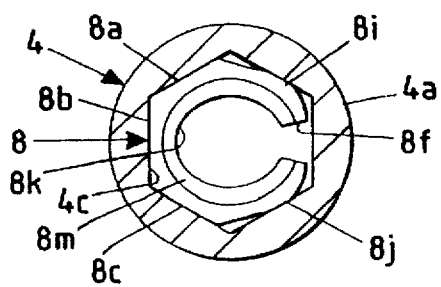
FIG. 4 is a sectional side view of the drive shaft and collar in the first embodiment when they are spread open and deformed outwardly in the diameter direction thereof.

If the threaded member 9 is threadedly engaged and tightened to thereby press against the other side of the collar 8 in the axial direction, then the collar 8 is spread open and deformed outwardly in the diameter direction thereof by the taper action due to the engagement between the tapered engaging surface 7b and the tapered surface 8m. As a result of this, as shown in FIG. 4, the outer surfaces 8a, 8b, 8c and chamfered curved surfaces 8i, 8j of the collar 8 are spread open and deformed outwardly in the diameter direction thereof and are thus pressed against the inner surface of the through hole 4c of the cylindrical drive shaft 4a. Due to such pressure contact of the collar 8 with the through hole 4c, the cylindrical drive shaft 4a and handle shaft 7 can be engaged stably, thereby making sure to prevent the handle shaft 7 from being loosened or clattered in the rotational direction thereof.

Also, if the collar 8 is pressed axially by the threaded member 9, then the collar 8 is spread open and deformed outwardly in the diameter direction by the tapered engaging surface 7b of the handle shaft 7, so that the engagement of the threaded member 9 can never be loosened even in such spread-open deformation because there exists a force acting against such spread-open deformation and a pressure caused by the threaded portion 9.

If the operation knob 20 is gripped and the handle 5 is rotated, then the rotor 3 is rotated through the handle shaft 7, cylindrical drive shaft 4a, pinion 2a and drive shaft 2, so that a fishing line (not shown) is wound round the spool 15.

When the handle mounting mechanism is structured in the above-mentioned manner, the outer surfaces 8a, 8b, 8c and chamfered curved surfaces 8i, 8j of the collar 8 are pressed against the inner surface of the through hole 4c of the cylindrical drive shaft 4a, so that the cylindrical drive shaft 4a and handle shaft 7 can be stably engaged with each other to thereby be sure to prevent the handle shaft 7 from being loosened in the rotational direction thereof. Thanks to this, a fishing line winding operation can be performed lightly and smoothly.

Also, if the collar 8 is pressed axially by the threaded member 9, then the collar 8 is spread open and deformed outwardly in the diameter direction due to the tapered engaging surface 7b of the handle shaft 7, so that the engagement of the threaded member 9 can never be loosened in such spread-open deformation because there exist a force to close such spread-open deformation and the pressure of the threaded portion 9.

Figure 5:
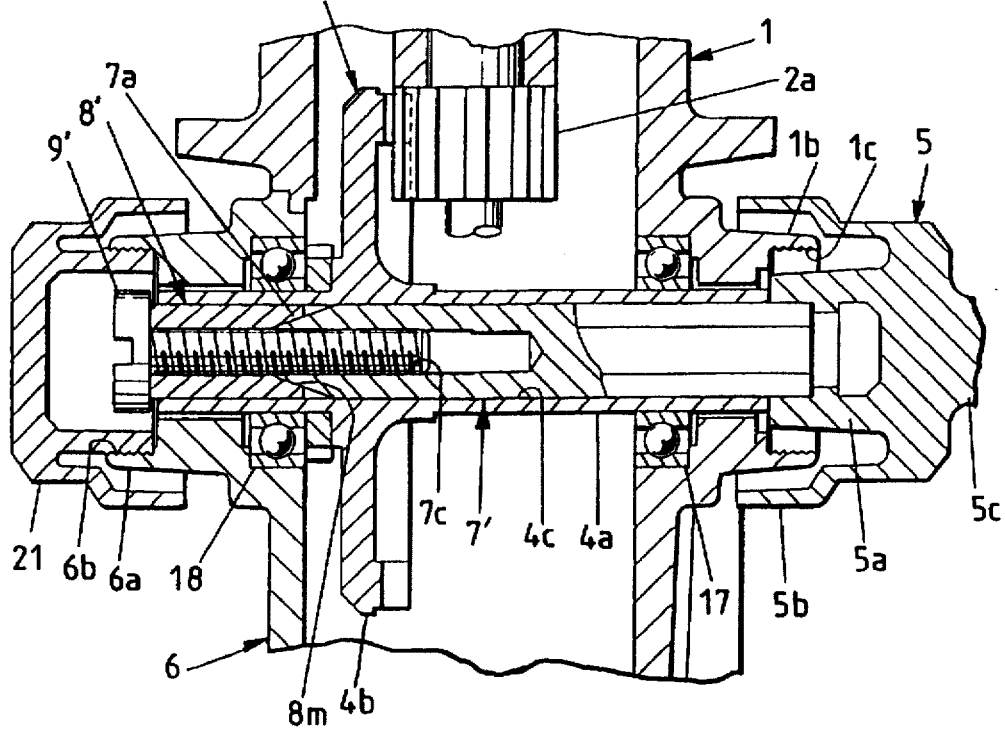
FIG. 5 is an enlarged sectional plan view of the main portions of a spinning reel for fishing to which a second embodiment of the invention is applied.

Now, referring to FIG. 5, there is shown a second embodiment of a handle mounting structure according to the invention.

In the second embodiment, the handle shaft 7 includes an internal thread 7c in the central portion thereof, one side of the handle shaft 7 is formed in a conical shape to thereby provide a tapered engaging surface 7b, and a threaded member 9' consisting of a screw is threadedly engaged with the internal thread 7c.

The other remaining portions of structure of the second embodiment are substantially the same as those in the first embodiment.

Figure 6A:
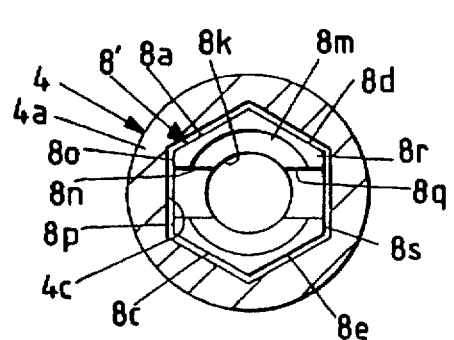
FIGS. 6(a) and 6(b) show a modified version of a collar; in particular.
Figure 6B:
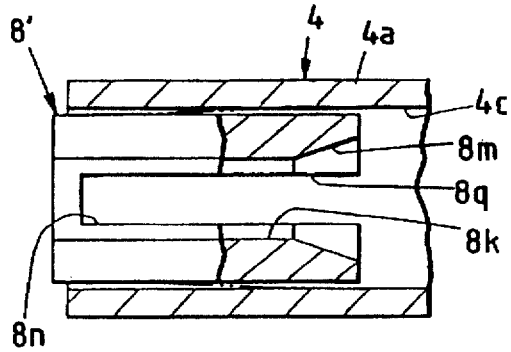
Figure 7:
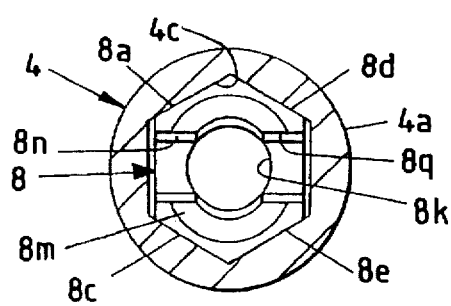
FIG. 7 is a sectional side view of the drive shaft and collar shown in FIG. 6 when they are spread open and deformed outwardly in the diameter direction thereof.

Now, in FIGS. 6(a), 6(b) and 7, there is shown a modified version of a collar. In particular, FIG. 6 (a) is a sectional side view of a drive shaft and a collar, FIG. 6 (b) is a sectional plan view of the drive shaft and collar, and FIG. 7 is a sectional side view of the drive shaft and collar when they are spread open and deformed outwardly in the diameter direction thereof.

A collar 8' is structured such that its outer shape has a polygonal section with a diameter smaller than the inside diameter of the through hole 4c of the cylindrical drive shaft 4a and includes outer surfaces 8a, 8c, 8d, 8e, outer surfaces 8o, 8p divided by a slit 8n, and outer surfaces 8r, 8s divided by a slit 8q.

Further, the collar 8' includes a through hole 8k in the central portion thereof, and one end portion of the collar 8' is formed in a conical shape to provide a tapered surface 8m.

The collar 8' is also structured such that the outer shape of the tapered surface 8m can be deformed outwardly in the diameter direction thereof as a result of the slits 8n, 8q.

When the collar 8' of the modification is assembled into the first and second embodiments, the handle shaft 7 (see FIG. 2) and collar 8' or the handle shaft 7' (see FIG. 5) and collar 8' are inserted into the through hole 4c of the cylindrical drive shaft 4a of the drive gear 4 before the collar 8' is mounted.

The collar 8' is inserted in such a manner that the tapered surface 8m of the collar 8' is disposed opposed to the tapered engaging surface 7b of the handle shaft 7 or 7' and the threaded member 9 or 9' is threadedly engaged with the handle shaft 7 or 7'.

If the threaded member 9 or 9' is threadedly engaged and tightened and the other side of the collar 8' is pressed axially, then the outer shape of the collar 8' at the tapered surface 8m side is spread open and deformed outwardly in the diameter direction by the taper action due to the engagement between the tapered engaging surface 7b and tapered surface 8m.

At that time, as shown in FIG. 7, the outer surfaces 8a, 8d of the collar 8' are deformed upwardly and the outer surfaces 8c, 8e thereof are deformed downwardly, and thus these outer surfaces are pressed against the inner surface of the through hole 4c of the cylindrical drive shaft 4a.

Due to such pressure contact of the outer surfaces of the collar 8' with the inner surface of the through hole 4c, the cylindrical drive shaft 4a and handle shaft 7 can be stably engaged with each other to thereby be sure to prevent the handle shaft 7 from being loosened in the rotational direction thereof, so that a fishing line winding operation can be performed lightly and smoothly.

In the foregoing description, the tapered surface 8m is provided on one side of the collars 8, 8'. However, the tapered surface 8m can be omitted and thus the taper action can be produced only by the tapered engaging surface 7b of the handle shaft 7.

Also, in the foregoing description, although the spinning reel for fishing is used as the fishing reel, the invention can also apply to other types of reels.

According to first and second embodiment of the present invention, the collar is spread open and deformed outwardly in the diameter direction thereof and is pressed against the drive shaft, which ensures that the drive shaft and handle shaft can be stably engaged with each other to thereby prevent the handle shaft from being loosened in the rotational direction thereof, so that a fishing line winding operation can be performed lightly and smoothly.

Also, if the collar is pressed in the axial direction thereof by the threaded member, then the collar is spread open and deformed outwardly in the diameter direction thereof, and thus the threaded engagement of the threaded member cannot be loosened because there exists a force acting against the spread-open deformation thereof and a pressure caused by the threaded member. That is, according to the invention, there can be provided a handle mounting structure for use in a fishing reel which can provide several excellent effects.

FIGS. 8 to 11(b) show a handle mounting structure according to a third embodiment of the invention, in which a spinning reel for fishing is employed as a fishing reel.

In the spinning reel for fishing, a collar 111 with a flange is fitted with the outer periphery of a cylindrical drive shaft 102 projected forwardly from a bearing 110 provided inside the front portion 101a of a reel main body 101, and a rotor 103 is fitted with the outer periphery of the cylindrical drive shaft 102 forwardly of the collar 111 in a rotation preventive manner and is fixed thereto by a nut 112.

The rotor 103 is supported in such a manner that it can be rotated in linking with the rotation of a handle 105 through a drive gear 104 and a cylindrical drive shaft 104a of a winding drive mechanism in mesh with a pinion 102a provided in the drive shaft 102.

A collar 113 is fitted with the portion of the outer periphery of the drive shaft 102 existing in front of the pinion 102a.

A spool 115 is supported in the leading end portion of a spool shaft 114 fitted into and projected from the cylindrical drive shaft 102, and the spool 115 can be reciprocated back and forth in linking with the rotation of the handle 105.

The bearing 110 is prevented against removal by a stop plate 116.

The drive gear 104 includes the cylindrical drive shaft 104a and a gear 104b, and the cylindrical drive shaft 104a is supported by a bearing 117 provided inside the side portion of the reel main body 101 and by a bearing 118 provided inside a cover member 106.

The outside of the side portion of the reel main body 101 and the outside of the cover member 106 respectively include cylindrical portions 101b, 106a with the axis of the cylindrical drive shaft 104a as the center thereof.

The handle 105 includes a mounting portion 105a, a cover portion 105b, a base portion 105c, and an arm 105d which are all formed integrally with one another.

One side portion of the handle shaft 107 is fixed to the central portion of the mounting portion 105a.

A shaft 119 is fixed to the arm 105d and an operation knob 120 is freely rotatably supported on the arm 105d.

The handle shaft 107 is so formed as to have a polygonal section and includes an internal thread 107a and a tapered engaging surface 107b, as shown in FIGS. 8, 9, 10(a) and 10(b).

An external thread 108a of the threaded member 108 is threadedly engaged with the internal thread 107a of the handle shaft 107, while a securing member 109 is rotatably inserted onto the rod portion 108b of the threaded member 108 and is prevented against removal by an E ring 121.

The threaded member 108 includes a cover portion 108c fixed thereto.

The handle mounting structure is arranged in such a manner that the through hole 104c of the cylindrical drive shaft 104a is so formed as to have a polygonal section, the handle shaft 107 fixed to the handle 105 is fitted into the through hole 104c in a rotation preventive manner, the threaded member 108 is threadedly engaged with the handle shaft 107, and the securing end portion 109e of the securing member 109 is inserted and engaged between the tapered engaging surface 107b and the inner surface of the through hole 104c formed in the drive shaft 104a.

Figure 8:
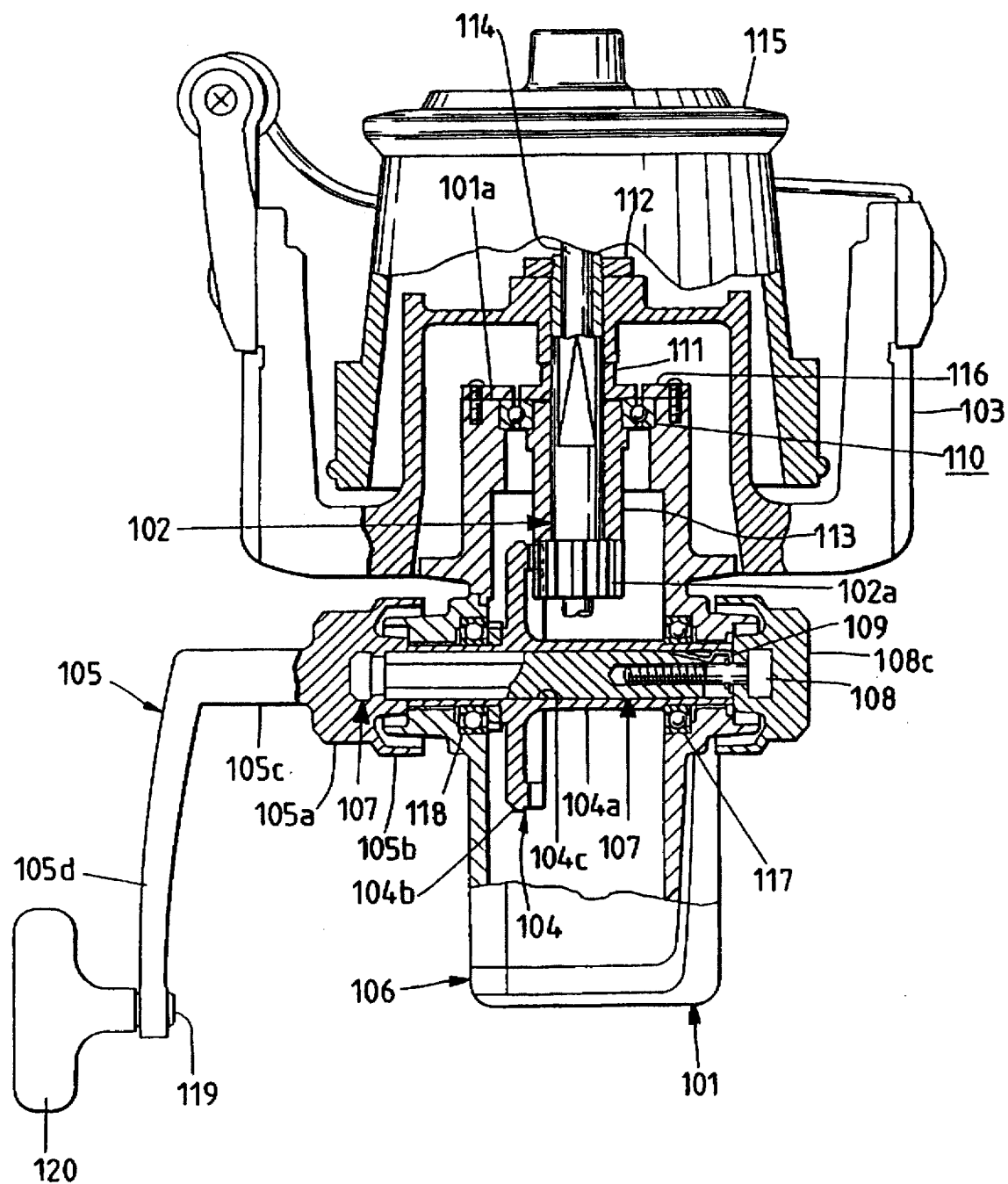
FIG. 8 is a sectional plan view of the main portions of a spinning reel for fishing to which a third embodiment of the invention is applied.

The securing member 109, as shown in FIGS. 8, 9 and 11, includes a disk portion 109a, a through hole 109b formed in the central portion of the disk portion 109a, two bent portions 109c, 109d extending from the outside portion of the disk portion 109a, and a securing end portion 109e formed on a leading end of the bent portion 109d.

The rod portion 108b of the threaded member 108 is inserted into the through hole 109b.

When the handle shaft 107 and securing member 109 are inserted into the through hole 104c in the cylindrical drive shaft 104a of the drive gear 104 and mounted there by the threaded member 108, the securing end portion 109e of the securing member 109 is abutted against the tapered engaging surface 107b of the handle shaft 107 and the external thread 108a of the threaded member 108 is threadedly engaged with the internal thread 107a of the handle shaft 107.

If the cover portion 108c is gripped by hand and the threaded member 108 is tightened, the securing end portion 109e of the securing member 109 is pressed against the tapered engaging surface of the handle shaft 107 and also the securing end portion 109e is pressed against the inner surface of the through hole 104c in the cylindrical drive shaft 104a of the drive gear 104.

Also, when the securing end portion 109e acts against the tapered engaging surface two bent portions 109c, 109d are pressed against the inner surface of the through hole 104c in the cylindrical drive shaft 104a of the drive gear 104.

Further, if the securing member 109 is pressed in the axial direction thereof by the threaded member 108, then the securing end portion 109e of the securing member 109 is pressed against the tapered engaging surface 107b of the handle shaft 107, and also the securing end portion 109e is pushed back to thereby press the two bent portions 109c, 109d against the inner surface of the through hole 104c in the cylindrical drive shaft 104a of the drive gear 104, so that the through hole 109b is pressed against the rod portion 108b of the threaded member 108.

If the operation knob 120 is gripped and the handle 105 is turned, then the rotor 103 is rotated as a result of torque transmitted through the handle shaft 107, cylindrical drive shaft 104a, drive gear 104, pinion 102a and drive shaft 102, so that a fishing line (not shown) can be wound round the spool 115.

When the handle mounting structure is arranged in the above-mentioned manner, then the securing end portion 109e of the securing member 109 is pressed against the tapered engaging surface 107b of the handle shaft 107 and, at the same time, the securing end portion 109e is pressed against the inner surface of the through hole 104c in the cylindrical drive shaft 104a of the drive gear 104.

Further, when the securing end portion 109e of the securing member 109 is pressed against the tapered engaging surface 107b of the handle shaft 107 and the securing end portion 109e is then pushed back, then the two bent portions 109c, 109d of the securing member 109 are pressed against the inner surface of the through hole 104c in the cylindrical drive shaft 104a of the drive gear 104.

These pressure contacts allow the cylindrical drive shaft 104a and handle shaft 107 to be stably engaged with each other, thereby surely preventing the handle shaft 107 from loosening in the rotational direction thereof, so that a fishing line winding operation can be performed lightly and smoothly.

Also, if the securing member 109 is pressed in the axial direction thereof by the threaded member 108, then the securing end portion 109e of the securing member 109 is pressed against the tapered engaging surface 107b of the handle shaft 107 and, at the same time, the securing end portion 109e is pushed back to press the bent portions 109c, 109d of the securing member 109 against the inner surface of the through hole 104c in the cylindrical drive shaft 104a of the drive gear 104, so that the through hole 109b is pressed against the rod portion 108b of the threaded member 108 to thereby prevent the threaded engagement of the threaded member 108 from being loosened.

Figure 12:
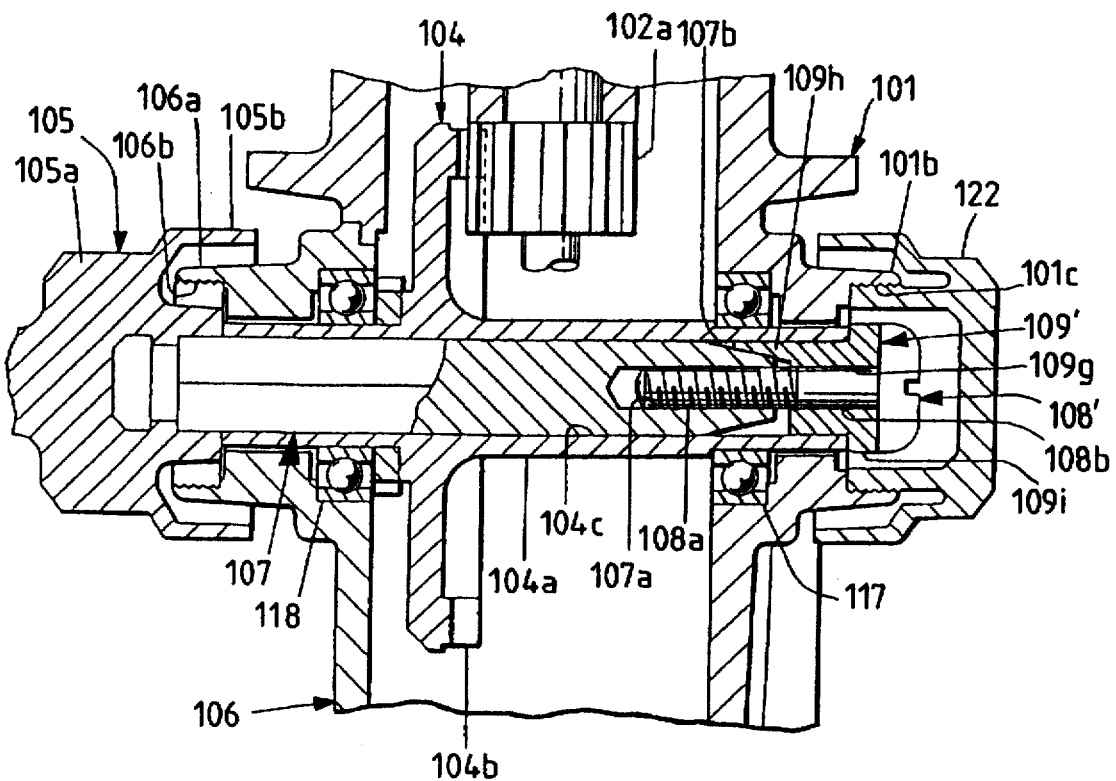
FIG. 12 is an enlarged sectional plan view of a spinning reel for fishing to which a fourth embodiment of the invention is applied.
Figure 13A:
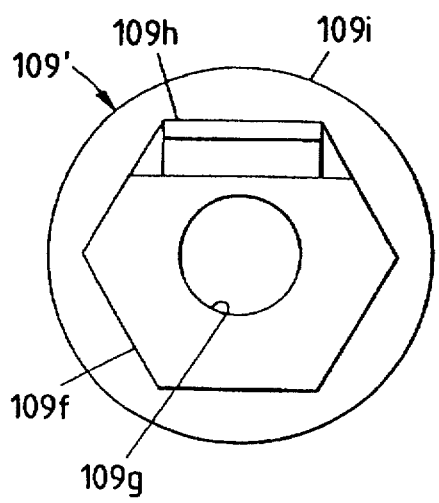
FIG. 13(a) is an enlarged front view of a securing member employed in the fourth embodiment.
Figure 13B:
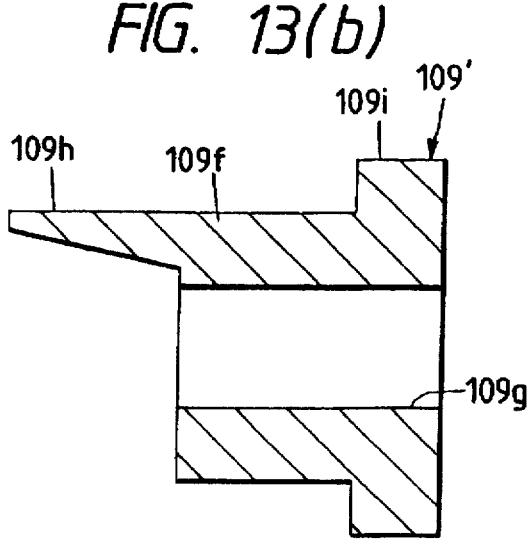
FIG. 13(b) is an enlarged sectional side view of the securing member.
Figure 14:
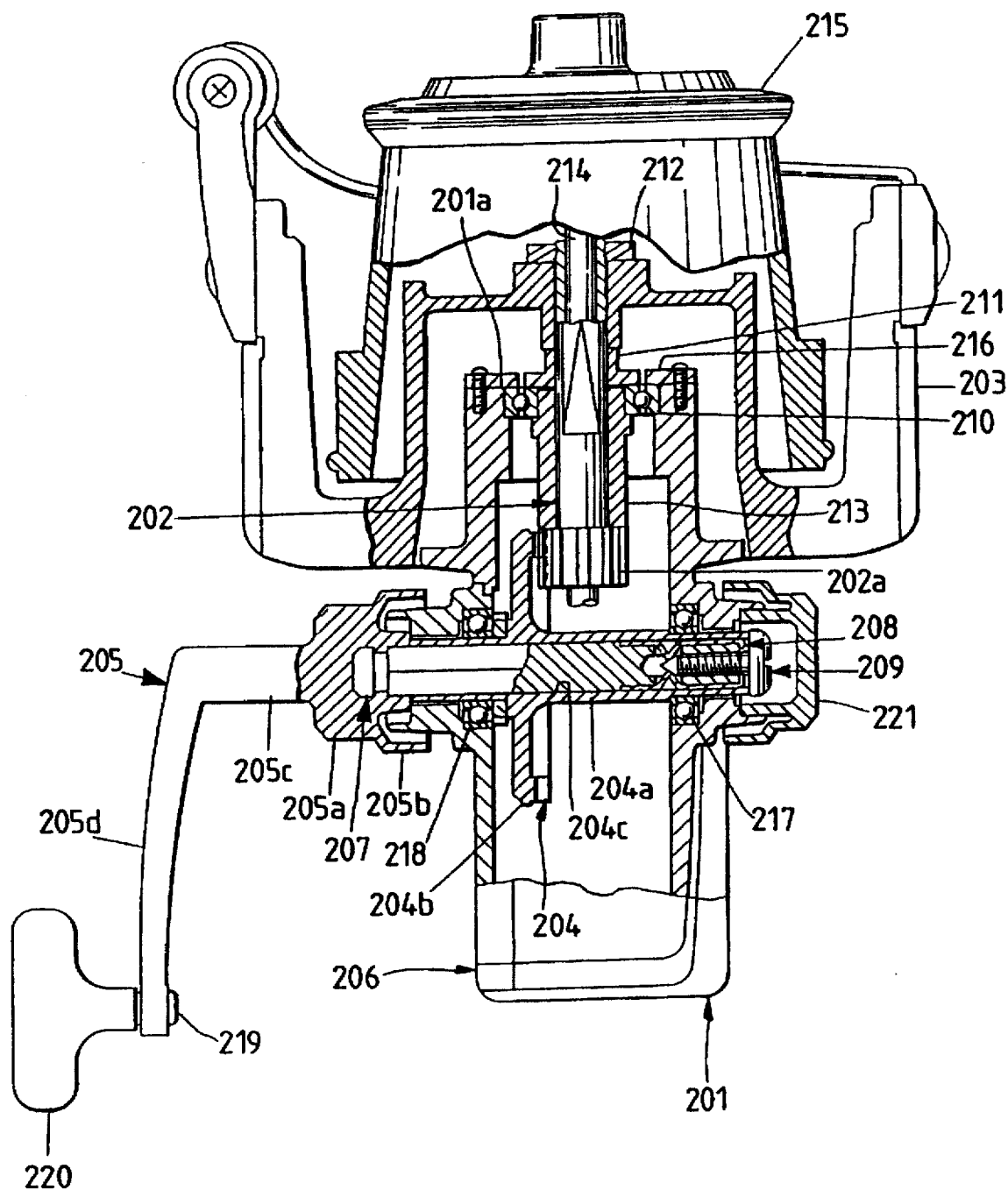
FIG. 14 is a sectional plan view of the main portions of a spinning reel for fishing to which a fifth embodiment of the present invention is applied.
Figure 15:
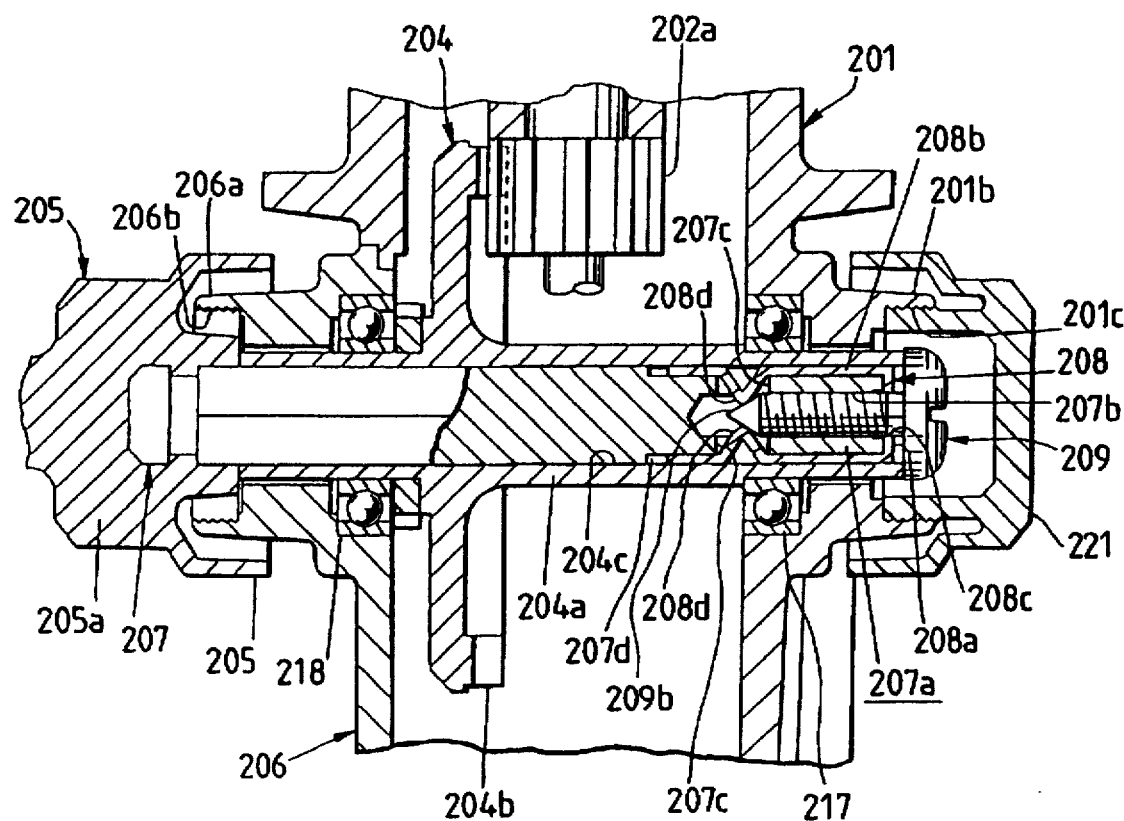
FIG. 15 is an enlarged sectional plan view of the main portions of a handle shown in FIG. 14.
Figure 16:
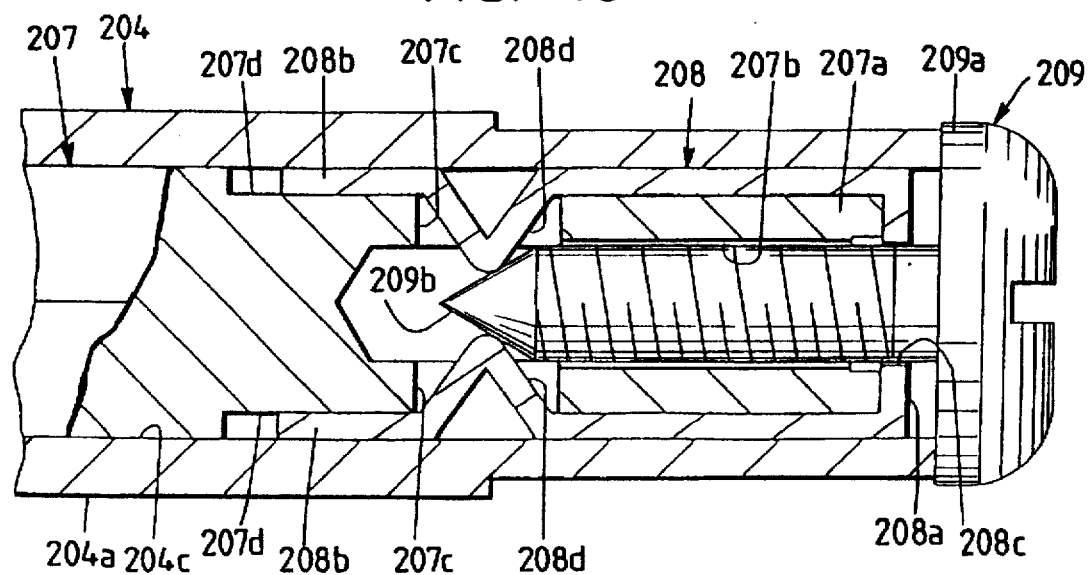
FIG. 16 is an enlarged sectional plan view of the main portions of a handle mounting structure shown of FIG. 15.
Figure 17A:
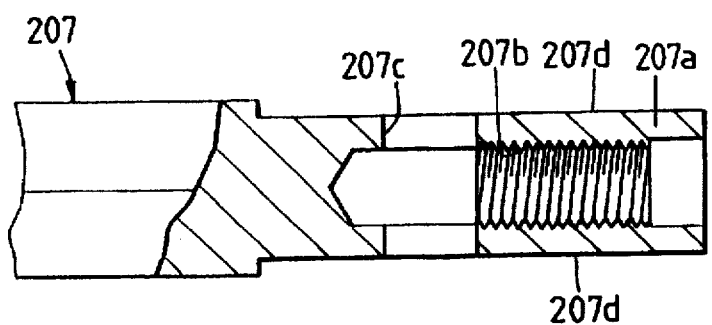
FIG. 17(a) is a sectional plan view of the main portions of a handle shaft; and, FIG. 17(b) is a front view of the handle shaft.
Figure 17B:
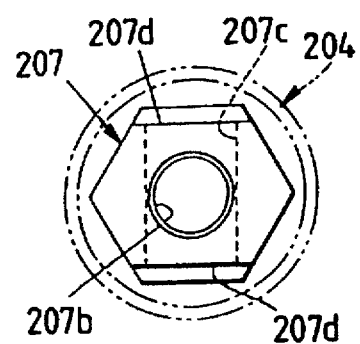
Figure 18A:
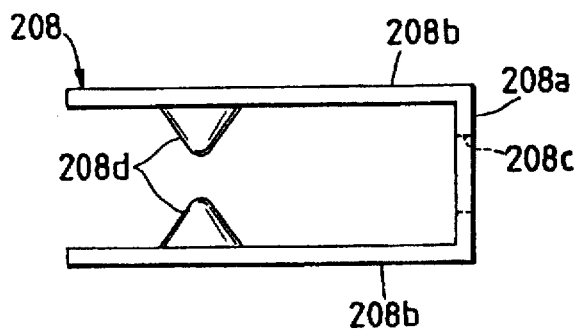
FIG. 18(a) is a plan view of a securing member; and, FIG. 18(b) is a front view of the securing member.
Figure 18B:
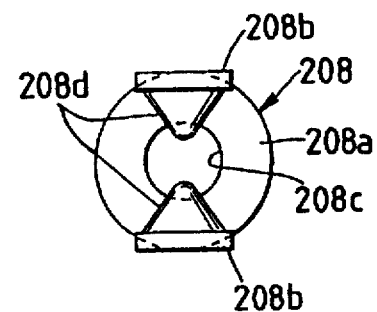
Figure 19:
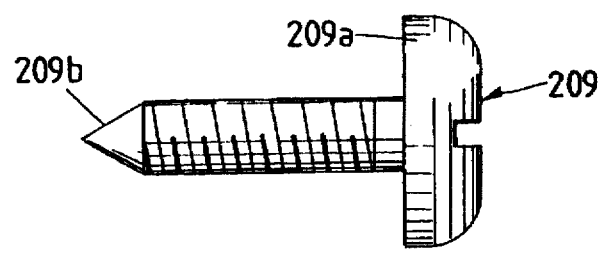
FIG. 19 is a side view of a threaded member.

Now, in FIGS. 12, 13(a) and 13(b), there is shown a handle mounting structure according to a fourth embodiment of the invention.

In the fourth embodiment, a handle shaft 107 is formed so as to have a polygonal section, and a tapered end while the handle shaft 107 includes an internal thread 107a formed in the central portion of the other side thereof and a tapered engaging surface 107b in the outer periphery thereof.

An external thread 108a formed in a threaded member 108' is threadedly engaged with the internal thread 107a and a securing member 109' formed of synthetic resin is rotatably inserted into a rod portion 108b of the threaded member 108'.

The securing member 109' includes a center through hole 109g formed in the central portion of a cylindrical portion 109f, a securing end portion 9h to be secured to the tapered engaging surface 107b of the handle shaft 107, and a flange portion 109i adapted to abut an end of the drive shaft 104a.

In the respective outsides of the side portion of the reel main body 101 and the cover member 106, there are respectively formed cylindrical portions 101b, 106a with the axis of the cylindrical drive shaft 104a as the center thereof, while threaded portions 101c, 106b are respectively formed in the inner peripheries of the cylindrical portions 101b, 106a.

A cover 122 is threadedly engaged with the threaded portion 101c of the reel main body 101 such that it can be removed freely.

When the handle 105 is mounted as a right handle, the cover 122 is threadedly engaged with the threaded portion 106b of the cover member 106 in a freely removable manner.

The other remaining portions of the structure of the fourth embodiment are substantially the same as those in the third embodiment.

When the handle shaft 107 and securing member 109' are inserted into the through hole 104c in the cylindrical drive shaft 104a of the drive gear 104 and are mounted thereto by the threaded member 108', then the securing end portion 109h of the securing member 109' is abutted against the tapered engaging surface 107b of the handle shaft 107 and the external thread 108a of the threaded member 108' is threadedly engaged with the internal thread 107a of the handle shaft 107.

If the threaded member 108' is tightened, then the securing end portion 109h of the securing member 109' is pressed against the tapered engaging surface 107b of the handle shaft 107 and, at the same time, the securing end portion 109h is deformed outwardly in the diameter direction thereof and is pressed against the inner surface of the through hole 104c in the cylindrical drive shaft 104a of the drive gear 104.

This pressure contact allows the cylindrical drive shaft 104a and handle shaft 107 to be stably engaged with each other, so that the handle shaft 107 can be surely prevented from loosening in the rotational direction thereof.

Also, if the securing member 109' is pressed in the axial direction thereof by the threaded member 108', then the securing end portion 109h of the securing member 109' is pressed against the tapered engaging surface 107b of the handle shaft 107 and, at the same time, if the securing end portion 109h is spread open and deformed outwardly in the diameter direction thereof, then the securing member 109' is pushed upwardly to thereby press the through hole 109g against the rod portion 108b of the threaded member 108', so that the threaded engagement of the threaded member 108' is surely prevented from being loosened.

The outer shape of the cylindrical portion 109f of the securing member 109' can be formed so as to have a polygonal section, or a circular section.

The flange portion 109i of the securing member 109' may be omitted.

In the foregoing description, the spinning reel for fishing is employed as the fishing reel. However, this is not limitative but other types of reels can also be used.

In the handle mounting structure according to the third and fourth embodiments of the present invention, the securing end portion of the securing member is pressed against the tapered engaging surface of the handle shaft and, at the same time, the securing end portion is also pressed against the inner surface of the cylindrical drive shaft of the drive gear.

This pressure contact allows the cylindrical drive shaft to be stably engaged with handle shaft to hereby be sure to prevent the handle shaft from loosening in the rotational direction hereof, so that a fishing line winding operation can be performed lightly and smoothly.

Also, if the securing member is pressed in the axial direction thereof by the threaded member, then the securing end portion of the securing member is pressed against the tapered engaging surface of the handle shaft and thus the securing member is deformed and is pressed against the threaded member, thereby preventing the threaded engagement of the threaded member from being loosened. That is, the present invention can provide such a handle mounting structure for use in a fishing reel that offers excellent effects.

FIGS. 14 to 19 show a handle mounting structure according to a fifth embodiment of the present invention, which is employed in a spinning reel for fishing.

The spinning reel for fishing includes a reel main body 201. In the spinning reel for fishing, a collar 211 with a flange is fitted with the outer periphery of a cylindrical drive shaft 202 which is projected out forwardly from a bearing 210 provided inside the front portion 201a of the reel main body 201, and a rotor 203 is fitted with the outer periphery of the cylindrical drive shaft 202 forwardly of the collar 211 in a rotation preventive manner and is fixed thereto by a nut 212.

The rotor 203 is supported in such a manner that it can be rotated in linking with the rotation of a handle 205 through a drive gear 204 and a cylindrical drive shaft 204a of a winding drive mechanism in mesh with a pinion 202a provided in the drive shaft 202.

A collar 213 is fitted with the portion of the outer periphery of the drive shaft 202 existing in front of the pinion 202a.

A spool 215 is supported in the leading end portion of a spool shaft 214 which is fitted into the cylindrical drive shaft 202 and is projected out therefrom, and the spool 215 can be reciprocated back and forth in linking with the rotation of the handle 205.

The bearing 210 is prevented against removal by a stop plate 216.

The drive gear 204 comprises a cylindrical drive shaft 204a and a gear 204b, and the cylindrical drive shaft 204a is supported by a bearing 217 provided inside the side portion of the reel main body and by a bearing 218 provided inside a cover member 206.

The handle mounting structure is arranged such that a through hole 204c provided in the cylindrical drive shaft 204a is so formed as to have a polygonal section, a handle shaft 207 fixed to the handle 205 is fitted into the through hole 204c in a rotation preventive manner, a securing member 208 is inserted into the through hole 204c, and a threaded member 209 is threadedly engaged with the handle shaft 207.

The handle 205 includes a mounting portion 205a, a cover portion 205b, a base portion 205c and an arm 205d which are all formed integrally with one another.

One side of the handle shaft 207 is fixed to the central portion of the mounting portion 205a.

A shaft 219 is fixed to the arm 205d and an operation knob 220 is supported rotatably on the arm 205d through the shaft 219.

The handle shaft 207 includes in the other end portion 207a a threaded hole 207b with an internal thread, an insertion hole 207c in communication with the threaded hole 207b, and upper and lower plane portions 207d, 207d.

A threaded member 209 is to be engaged with the internal threads of the threaded hole 207b.

The securing member 208 includes a disk portion 208a and two arm portions 208b, 208b respectively extending in one direction from the upper and lower ends of the disk portion 208a such that these three portions cooperate in forming a U shape. The securing member 208 further includes a through hole 208c formed in the central portion of the disk portion 208a, and projection portions 208d, 208d which are respectively provided at the leading end sides of the arm portions 208b, 208b and face inwardly.

The threaded member 209 includes a head portion 209a and a tapered engaging surface 209b which is formed in the leading end portion of the threaded member 209 and has a conical shape.

In the respective outer sides of the side portions of the reel main body 201 and cover member 206, there are formed cylindrical portions 201b and 206a with the axis of the cylindrical drive shaft 204a as the center thereof.

A cover 221 is threadedly engaged with a threaded portion 201c of the reel main body 201 in such a manner that the cover 221 can be freely mounted and removed.

When the handle 205 is mounted as a right handle, the cover 221 is threadedly engaged with a threaded portion 206b of the cover member 206.

When the handle shaft 207 and securing member 208 are inserted into and mounted to the through hole 204c of the cylindrical drive shaft 204a of the drive gear 204, the arm portions 208b, 208b of the securing member 208 are respectively put on the upper and lower plane portions 207d, 207d of the handle shaft 207, and the disk portion 208a of the securing member 208 is abutted against the end portion 207a of the handle shaft 207.

In this manner, the projection portions 208d, 208d of the securing member 208 are respectively fitted into the insertion hole 207c of the handle shaft 207.

Next, the threaded member 209 is threadedly engaged with the internal thread of the threaded hole 207b of the handle shaft 207. When the threaded member 209 is threadedly engaged and tightened, the inside of the head portion 209a of the threaded member 209 is abutted against the end portion of the cylindrical drive shaft 204a and the conically shaped, tapered engaging surface 209b of the leading end portion of the threaded portion 209 is abutted against the projection portions 208d, 208d so that the projection portions 208d, 208d are pushed outwardly.

When the projection portions 208d, 208d are pushed outwardly, then the arm portions 208b, 208b are deformed outwardly in the diameter direction thereof and are thus pressed against the inner surface of the through hole 204c of the cylindrical drive shaft 204a.

Also, if the projection portions 208d, 208d are pressed by the conically shaped, tapered engaging surface 209b of the threaded member 209, then such pressure prevents the engagement of the threaded member 209 from being loosened.

If the operation knob 220 is gripped and the handle 205 is rotated, then the rotor 203 is rotated through the handle shaft 207, cylindrical drive shaft 204a, drive gear 204, pinion 202a and drive shaft 202, so that a fishing line (not shown) is wound round the spool 215.

When the handle mounting structure is arranged in the above-mentioned manner, the projections 208d, 208d are pushed up by the conically shaped, tapered engaging surface 209b of the leading end portion of the threaded member 209 and thus the arm portions 208b, 208b are deformed outwardly in the diameter direction thereof and are pressed against the inner surface of the through hole 204c of the cylindrical drive shaft 204a. This ensures that the cylindrical drive shaft 204a and handle shaft 207 are stably engaged with each other to prevent the handle shaft 207 from being loosened in the rotational direction thereof, so that a fishing line winding operation can be performed lightly and smoothly.

Also, when the projection portions 208d, 208d are pressed by the conically shaped, tapered engaging surface 209b of the threaded member 209, then such pressure prevents the engagement of the threaded member 209 from being loosened.

Figure 20A:
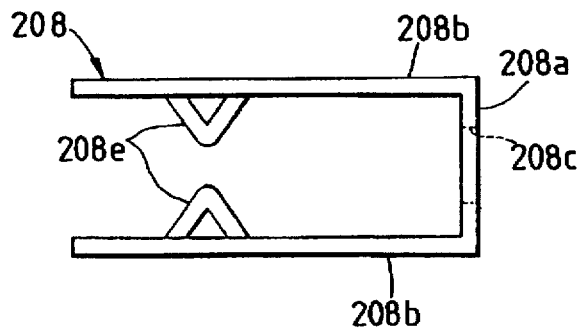
FIGS. 20(a) and 20(b) shows a modified version of a securing member; in particular.
Figure 20B:
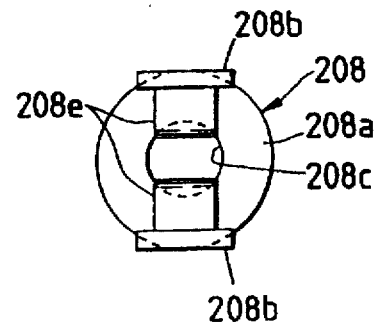

Now, referring to FIGS. 20(a) and 20(b), there is shown a modified version of a securing member.

The securing member 208 includes projection portions 208e, 208e which are respectively provided so as to project inwardly from the arm portions 208b, 208b thereof.

When the projection portions 208e, 208e of the securing member 208 are structured in this manner, the projection portions 208e, 208e are pushed up by the conically shaped, tapered engaging surface 209b of the leading end portion of the threaded member 209 and thus the arm portions 208b, 208b are deformed outwardly in the diameter direction and are pressed against the inner surface of the through hole 204c of the cylindrical drive shaft 204a. Also, when the projection portions 208e, 208e are pushed up and thereby flexed, then such push-up pressure prevents the engagement of the threaded member 209 from being loosened.

In the foregoing description, although the spinning reel for fishing is employed as the fishing reel, this is not limitative but the present invention can also apply to types of reels.

According to the fifth embodiment of the present invention structured in the above-mentioned manner, since the projection portions are pushed up by the conically shaped, tapered engaging surface formed in the leading end portion of the threaded member, the arm portions are deformed outwardly in the diameter direction thereof and are thus pressed against the inner surface of the cylindrical drive shaft. Thus, the cylindrical drive shaft can be stably engaged with the handle shaft to thereby be sure to prevent the handle shaft from being loosened in the rotational direction thereof, so that a fishing line winding operation can be performed lightly and smoothly.

Also, if the projection portions are pushed by the conically shaped, tapered engaging surface of the threaded member, then such pressure prevents the engagement of the threaded member from being loosened. That is, the present invention can provide a handle mounting structure for use in a fishing reel which has such excellent effects as mentioned above.

Figure 21:
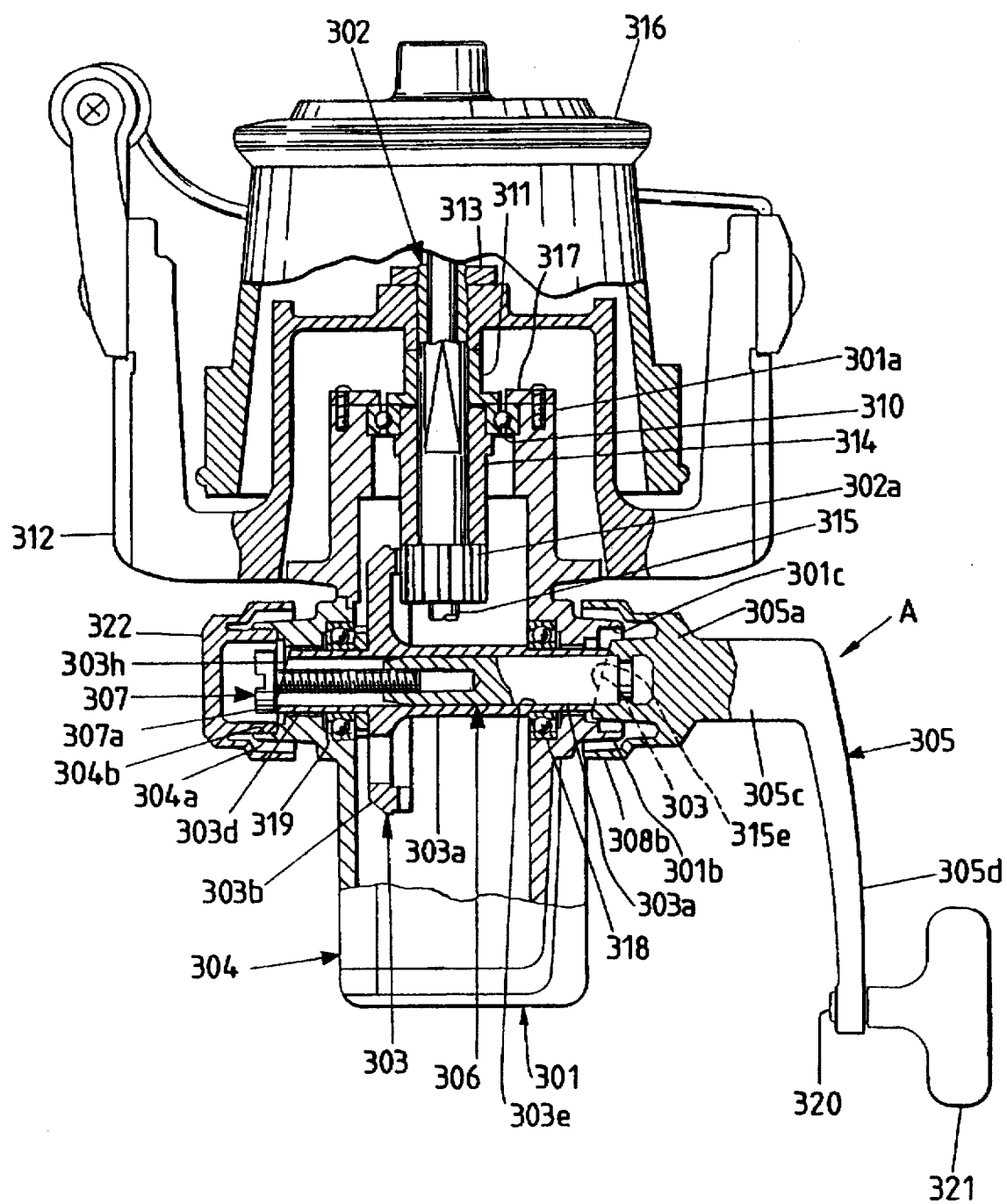
FIG. 21 is a longitudinally sectional plane view of a spinning reel for fishing to which a sixth embodiment of the present invention is applied.
Figure 22:
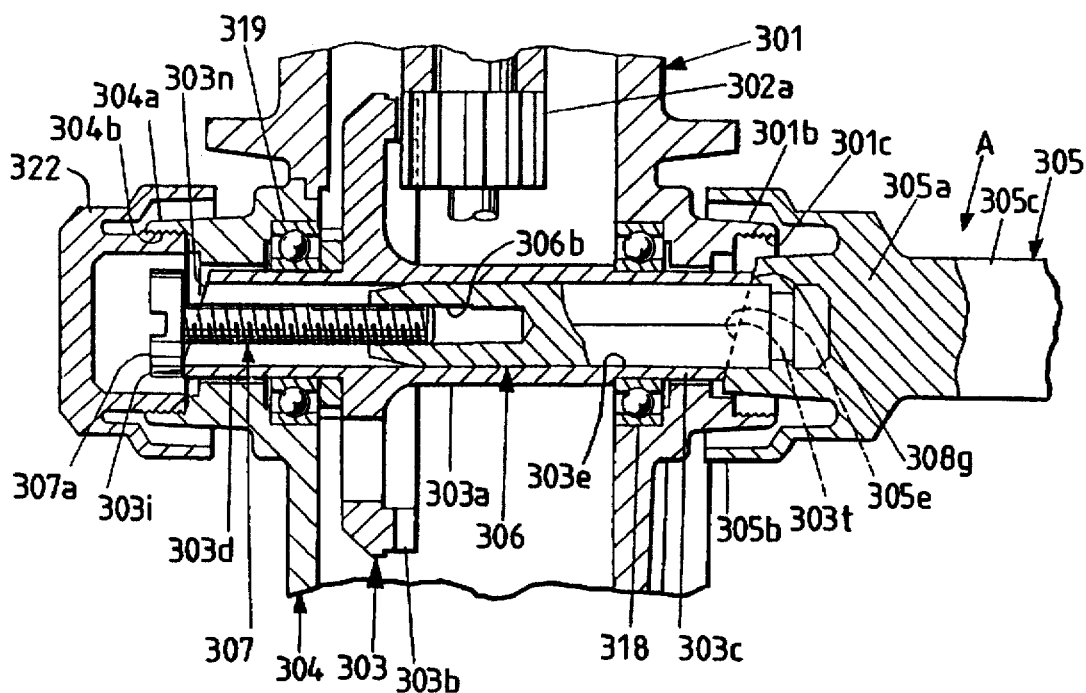
FIG. 22 is an enlarged sectional plane view of main portions of a handle mounting structure shown in FIG. 21.
Figure 23:
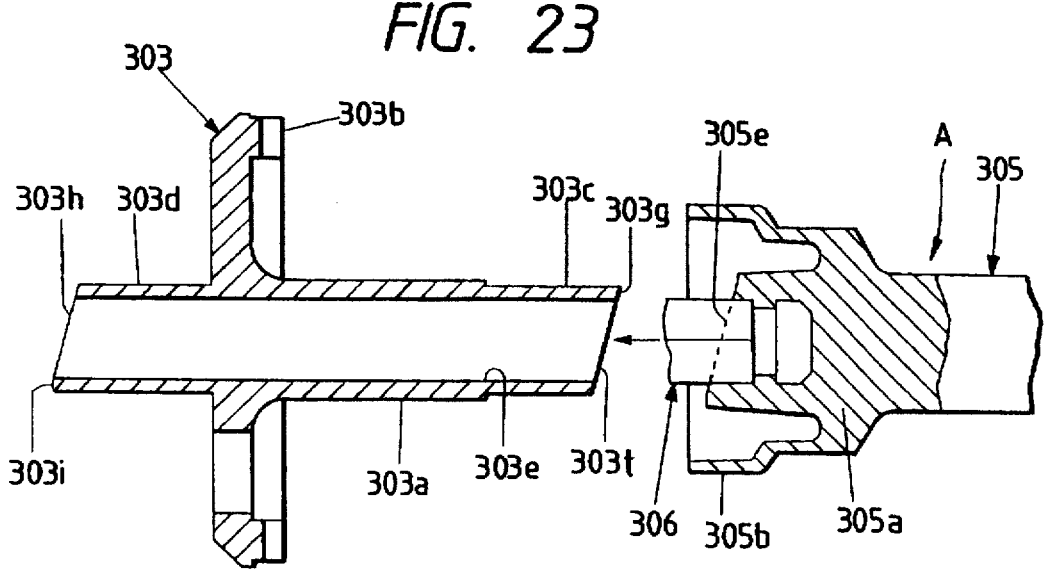
FIG. 23 is an exploded, enlarged sectional plane view showing a drive shaft having a drive gear and a mounting portion of a handle shaft.

FIGS. 21–23 show a sixth embodiment of the present invention. In the spinning reel for fishing, a collar 311 having a flange is fitted on an outer periphery of a portion of a cylindrical drive shaft 302 projecting from a bearing 310 installed inside a front portion 301a of a reel main body 301. Forwardly of the collar 311, a rotor 312 is non-rotatably fitted on the cylindrical drive shaft 302 and fixed in place by a nut 313.

The rotor 312 is supported so as to be rotatably driven in linking with the rotation of a handle member A through a wind-up drive mechanism including a cylindrical drive shaft 313a and a drive gear 303 meshing with a pinion 302a provided on the drive shaft 302.

A collar 314 is fitted on an outer periphery of the drive shaft 302 forwardly of the pinion 302a.

A spool 316 is supported on a leading or distal end of a spool shaft 315 which fittingly passes through the cylindrical drive shaft 312 and projects therefrom. The spool 316 is driven to reciprocate forwardly and backwardly in linking with the rotation of the handle member A.

A stop plate 317 is provided so as to prevent the removal of the bearing 310.

The drive gear 303 is made up of a cylindrical drive shaft 303a and a gear wheel 303b, and one end 303c of the cylindrical drive shaft 303a is axially supported by a bearing 318 installed on the inner portion of the side part of the reel main body 301, whereas the other end 303d of the cylindrical drive shaft 303a is axially supported by a bearing 319 installed on the inner portion of a lid 304.

A handle mounting structure is arranged such that a through hole 303e of the cylindrical drive shaft 303a is formed into a polygon in section so as to non-rotatably receive a handle shaft 306 fixed on a handle portion 305 of the handle member A, and a female threaded hole 306b is formed in the opposite end of the handle shaft 306 so as to threadingly receive a screw or threaded member 307. The handle shaft 306 can be inserted into the through-hole 303e leftward and rightward so that the handle portion 305 can be selectively disposed on the right side or left side with respect to the main body 301.

The handle portion 305 of the handle member A has an integral mounting portion 305a, an integral cover portion 305b, an integral arm base portion 305c and an integral arm 305d. One end of the handle shaft 306 is fixed on the center of the mounting portion 305a. The head portion 307a of the threaded member 307 is formed so as to be larger in outer diameter than the cylindrical drive shaft 303a. A shaft 320 is fixed on the handle arm 305d so as to rotatably support an operation knob 321 thereon. The cylindrical drive shaft 303a is formed at its one end 303c with an engagement portion 303f in the form of slope and a perpendicular end face 303g, and at its the other end 303d with an engagement portion 303h in the form of slope 303h and a perpendicular end face 303*i*. A slope 305*e* is formed on the end face of the mounting portion 305*a* of the handle portion 305.

Cylindrical portions 301*b* and 304*a* are respectively formed on the outer portion of the side part of the reel main body 1 and the outer portion of the lid 304. Thread portions are respectively formed on the inner peripheries of the cylindrical portions 301*b* and 304*b*. In FIG. 22, a cover 322 is detachably threaded onto the thread portion 304*b* provided on the side of the lid 304. When the handle portion 305 should be positioned in the leftside in FIG. 22, the cover 322 is detachably threaded onto the thread portion 301*c* provided on the side of reel main body 301.

When the cylindrical drive shaft 303*a* of the drive gear 303 and the handle shaft 306 of the handle member A are coupled together, the handle shaft 306 is inserted into the through-hole 303*e* of the cylindrical drive shaft 303*a*, and the threaded member 307 is tightened to the handle shaft 306 so that the engagement portion 303*f* in the form of the slope and located at one end is brought into contact with the slope 305*e* whereas the perpendicular end face 303*i* located at the other end is brought into contact with the inner face of the head portion 307*a* of the threaded member 307.

Tightening the threaded member 307 to the handle shaft 306 causes a longitudinal depressing force onto the engagement portion 303*f* in the form of slope and the slope 305*e*, to thereby provide the slope surface guiding effect such that the side of the one end portion 303*c* of the cylindrical drive shaft 303*a* is displaced upwardly whereas the handle shaft 306 on the same side is diametrically displaced downwardly in FIG. 22. As a consequence, the handle shaft 306, which is non-rotatably fitted in the through-hole 303*e* of the cylindrical drive shaft 303*a*, is brought into pressure-contact with the inner surface of the through-hole 303*e* of the cylindrical drive shaft 303*a*.

If the handle 305 is to be arranged in the left side with respect to the reel main body 301, the handle shaft 306 of the handle member A is inserted into the through-hole 303*e* of the cylindrical drive shaft 303*a* in the leftward direction in FIG. 23. Thereafter, the threaded member 307 is tightened to the handle shaft 306 so that the engagement portion 303*h* in the form of the slope is brought into contact with the slope surface 305*e* whereas the perpendicular end face 303*g* is brought into contact with the inner face of the head portion 307*a* of the threaded member 307.

Tightening the threaded member 307 to the handle shaft 306 causes a longitudinal depressing force onto the engagement portion 303*h* in the form of slope and the slope 305*e*, to thereby provide the slope surface guiding effect such that the side of the other end portion 303*d* of the cylindrical drive shaft 303*a* is displaced downwardly whereas the handle shaft 306 on the same side is diametrically displaced upwardly. As a consequence, the handle shaft 306, which is non-rotatably fitted in the through-hole 303*e* of the cylindrical drive shaft 303*a*, is brought into pressure-contact with the inner surface of the through-hole 303*e* of the cylindrical drive shaft 303*a*.

In the handle mounting structure mentioned above, the handle shaft 306 is diametrically displaced by utilizing the slope surface guiding effect produced between the engagement portion 303*f* in the form of the slope and the slope surface 305*e* or between the engagement portion 303*h* in the form of the slope and the slope surface 305*e*, so that the handle shaft 306 is brought into pressure-contact with the inner surface of the through-hole 303*e* of the cylindrical drive shaft 303*a*. Thus, it is possible to stably and securely remove the undesirable circumferential clearance or play of the handle shaft 306.

Further, bringing the perpendicular end face 303*g* on the one side or the perpendicular end face 303*i* on the other end into contact with the inner face of the head portion 307*a* of the threaded member 307 contributes to providing the slope surface guide effect stably.

Figure 24:
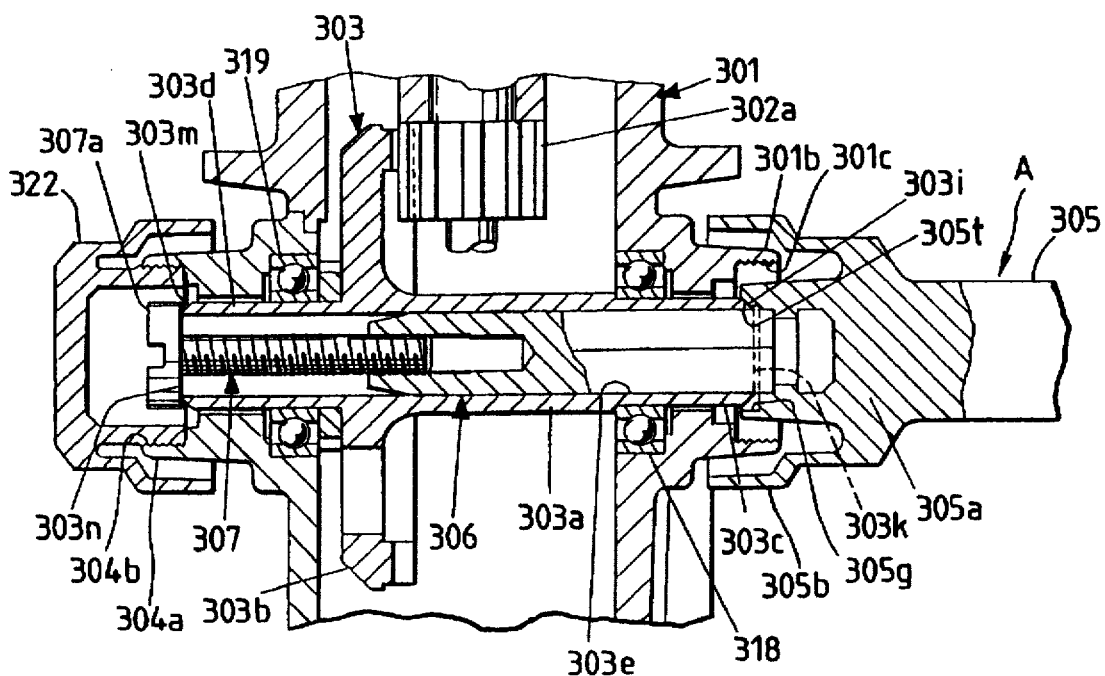
FIG. 24 is an enlarged sectional plane view showing main portions of a handle mounting structure to which a seventh embodiment of the present invention is applied.
Figure 25:
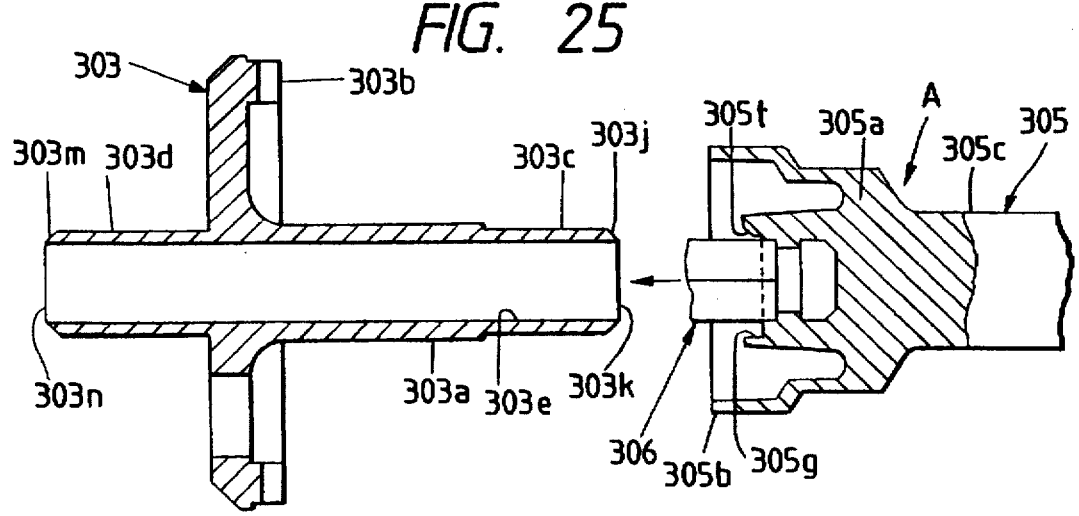
FIG. 25 is an exploded, enlarged sectional plane view showing a drive shaft having a drive gear and a mounting portion of a handle shaft.
Figure 26:
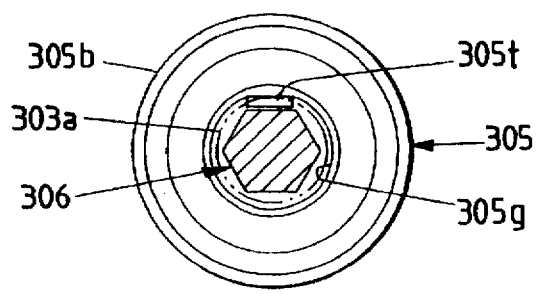
FIG. 26 is a front view of the mounting portion of the handle shaft.

FIGS. 24 to 26 show a seventh embodiment. In the seventh embodiment, the engagement portion 303*j* and the perpendicular end face 303*k* are formed on the one end portion 303*c* of the cylindrical drive shaft 303*a* of the drive gear 303 such that the engagement portion 303*j* in the form of slope circumscribes the perpendicular end face 303*k*. On the other end 303*d* of the cylindrical drive shaft 303*a*, the engagement portion 303*m* and the perpendicular end face 303*n* are formed similarly. On the other hand, the end face of the mounting portion 303*a* of the handle portion 305 is arranged such that a slope surface 305*f* is formed partially around the circumference of the proximal portion of the handle shaft 306, and a notch 305*g* is formed around the circumference of the proximal portion of the handle shaft 306 except a portion where the slope surface 305*f* is provided. Other construction is substantially the same as that of the sixth embodiment.

When the cylindrical drive shaft 303*a* of the drive gear 303 and the handle shaft 306 of the handle member A are coupled together, the handle shaft 306 is inserted into the through-hole 303*e* of the cylindrical drive shaft 303*a*, and the threaded member 307 is tightened to the handle shaft 306 so that the engagement portion 303*j* in the form of the slope and located at one end is brought into contact with the slope 305*f* whereas the perpendicular end face 303*n* located at the other end is brought into contact with the inner face of the head portion 307*a* of the threaded member 307.

Tightening the threaded member 307 to the handle shaft 306 causes a longitudinal depressing force onto the engagement portion 303*j* in the form of slope and the slope 305*f*, to thereby provide the slope surface guiding effect such that the side of the one end portion 303*c* of the cylindrical drive shaft 303*a* is displaced downwardly whereas the handle shaft 306 on the same side is diametrically displaced upwardly in FIG. 24. As a consequence, the handle shaft 306, which is non-rotatably fitted in the through-hole 303*e* of the cylindrical drive shaft 303*a*, is brought into pressure-contact with the inner surface of the through-hole 303*e* of the cylindrical drive shaft 303*a*. Because of the provision of the notch portion 305*g*, there is no hinderance when the side of the one end 303*c* is displaced downwardly.

If the handle 305 is to be arranged in the left side with respect to the reel main body 301, the handle shaft 306 of the handle member A is inserted into the through-hole 303*e* of the cylindrical drive shaft 303*a* in the leftward direction in FIG. 25. Thereafter, the threaded member 307 is tightened to the handle shaft 306 so that the engagement portion 303*m* in the form of the slope is brought into contact with the slope surface 305*f* whereas the perpendicular end face 303*k* of the one end 303*c* is brought into contact with the inner face of the head portion 307*a* of the threaded member 307.

Tightening the threaded member 307 to the handle shaft 306 causes a longitudinal depressing force onto the engagement portion 303*m* in the form of slope and the slope 305*f*, to thereby provide the slope surface guiding effect such that the side of the other end portion 303*d* of the cylindrical drive shaft 303*a* is displaced downwardly whereas the handle shaft 306 on the same side is diametrically displaced upwardly. As a consequence, the handle shaft 306, which is non-rotatably fitted in the through-hole 303*e* of the cylindrical drive shaft 303*a*, is brought into pressure-contact with the inner surface of the through-hole 303e of the cylindrical drive shaft 303a.

Slightly arcuate chamfering surfaces may be formed as the engagement portions 303i and 303m.

Figure 27:
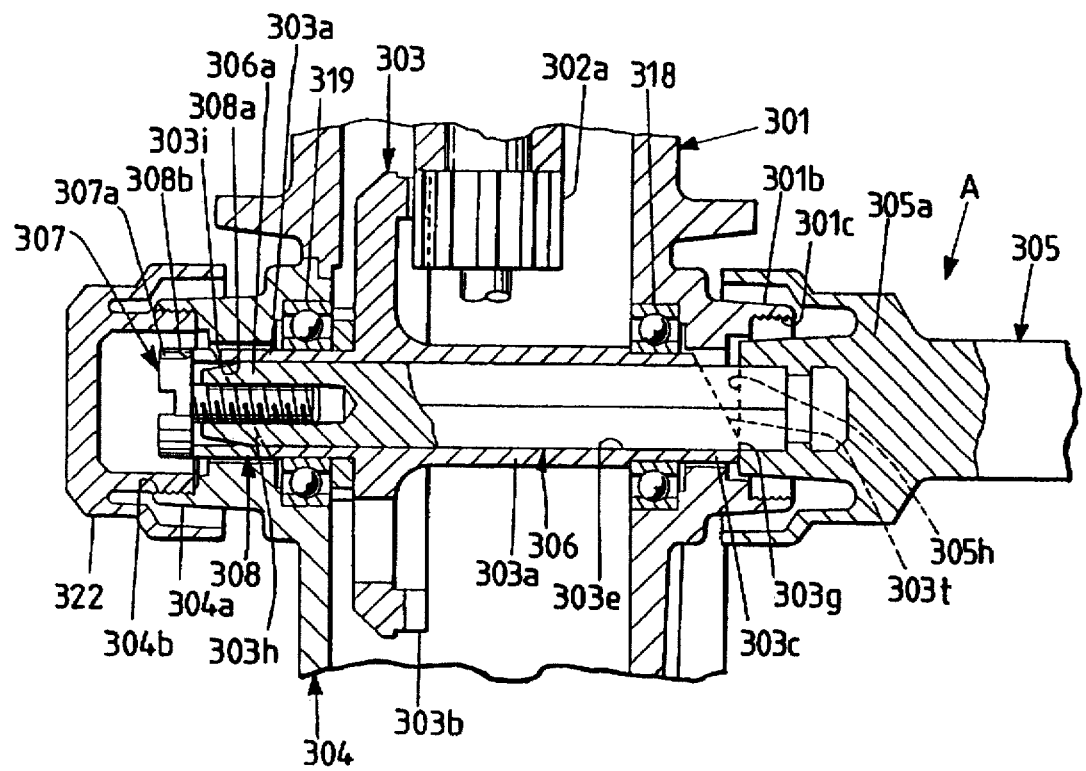
FIG. 27 is an enlarged sectional plane view showing main portions of a handle mounting structure to which an eighth embodiment of the present invention is applied.
Figure 28:
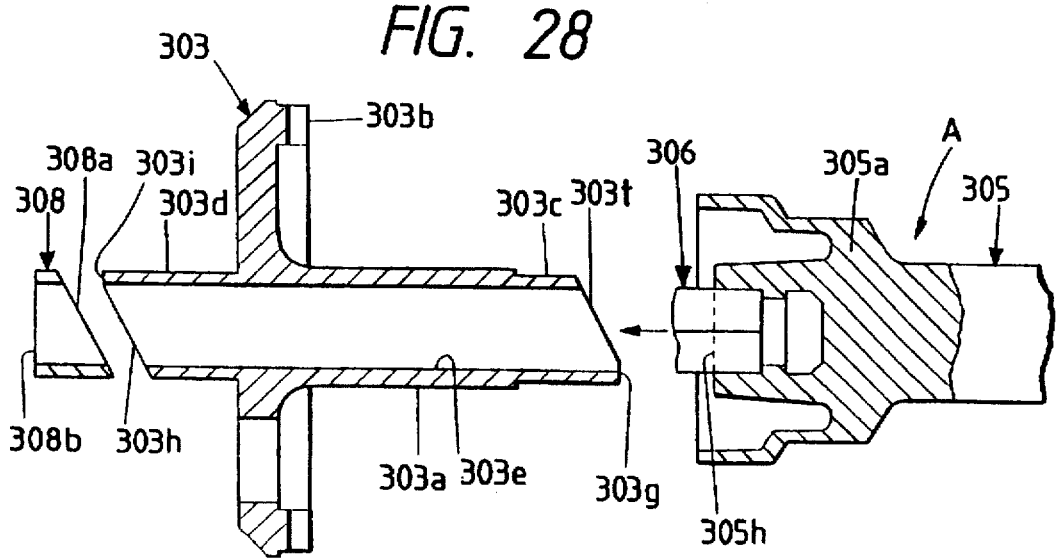
FIG. 28 is an exploded, enlarged sectional view showing a drive shaft having a drive gear add a mounting portion of a handle shaft.

FIGS. 27 and 28 show an eighth embodiment of the present invention. In the eighth embodiment, the longitudinal length between both ends of the cylindrical drive shaft 303a is slightly different from that in the sixth embodiment, but the cylindrical drive shaft is similar in configuration to that of the sixth embodiment, so that the same or similar reference numerals are denoted to functionally the same or corresponding portions. The engagement portion 303f in the form of slope and the perpendicular end face 303g are formed in the one end portion 303c of the cylindrical drive shaft 303a of the drive gear 303, and the engagement portion 303h in the form of the slope and the perpendicular end face 303i are formed in the other end portion 303d thereof.

The handle member A is made up of the handle portion 305, handle shaft 306 and a collar 308. The perpendicular surface 305h is formed on the end face of the mounting portion 305a of the handle portion 305. The collar 308 is non-rotatably (or may be rotatably) fitted on the outer periphery of the other end portion 306a of the handle shaft 306. The collar 308 is formed at its one end with a slope surface 308a and at its the other end with a perpendicular surface 308b. The collar 308 may be fitted on the outer periphery of the threaded member 307 when the handle shaft 306 is formed to have a relatively short longitudinal length.

Other structure is similar to that of the sixth embodiment.

When the cylindrical drive shaft 303a of the drive gear 303 and the handle shaft 306 of the handle member A are coupled together, the handle shaft 306 is inserted into the through-hole 303e of the cylindrical drive shaft 303a, and the threaded member 307 is tightened to the handle shaft 306 so that the perpendicular end face 303g of the one end portion 303c is brought into contact with the perpendicular surface 305h of the end face of the mounting portion 305a, the slope surface engagement portion 303h of the other end portion 303d is brought into contact with the slope surface 308a of the collar 308, and the perpendicular surface 308b of the collar 308 is brought into contact with the inner end face of the head portion 307a of the threaded member 307.

Tightening the threaded member 307 to the handle shaft 306 causes a longitudinal depressing force onto the engagement portion 303h in the form of slope and the slope 308a, to thereby provide the slope surface guiding effect such that the side of the other end portion 303d of the cylindrical drive shaft 303a is displaced upwardly whereas the handle shaft 306 on the same side is diametrically displaced downwardly in FIG. 27. As a consequence, the handle shaft 306, which is non-rotatably fitted in the through-hole 303e of the cylindrical drive shaft 303a, is brought into pressure-contact with the inner surface of the through-hole 303e of the cylindrical drive shaft 303a.

If the handle 305 is to be arranged in the left side with respect to the reel main body 301, the handle shaft 306 of the handle member A is inserted into the through-hole 303e of the cylindrical drive shaft 303a in the leftward direction in FIG. 28. Thereafter, the threaded member 307 is tightened to the handle shaft 306 so that the perpendicular end face 303i of the other end portion 303d is brought into contact with the perpendicular surface 305h of the end face of the mounting portion 305a, the slope surface engagement portion 303f of the one end portion 303c is brought into contact with the slope surface 308a of the collar 308, and the perpendicular surface 308b of the collar 308 is brought into contact with the inner end face of the head portion 307a of the threaded member 307.

Tightening the threaded member 307 to the handle shaft 306 causes a longitudinal depressing force onto the engagement portion 303f in the form of slope and the slope 308a, to thereby provide the slope surface guiding effect such that the side of the other end portion 303d of the cylindrical drive shaft 303a is displaced downwardly whereas the handle shaft 306 on the same side is diametrically displaced upwardly. As a consequence, the handle shaft 306, which is non-rotatably fitted in the through-hole 303e of the cylindrical drive shaft 303a, is brought into pressure-contact with the inner surface of the through-hole 303e of the cylindrical drive shaft 303a.

Figure 29:
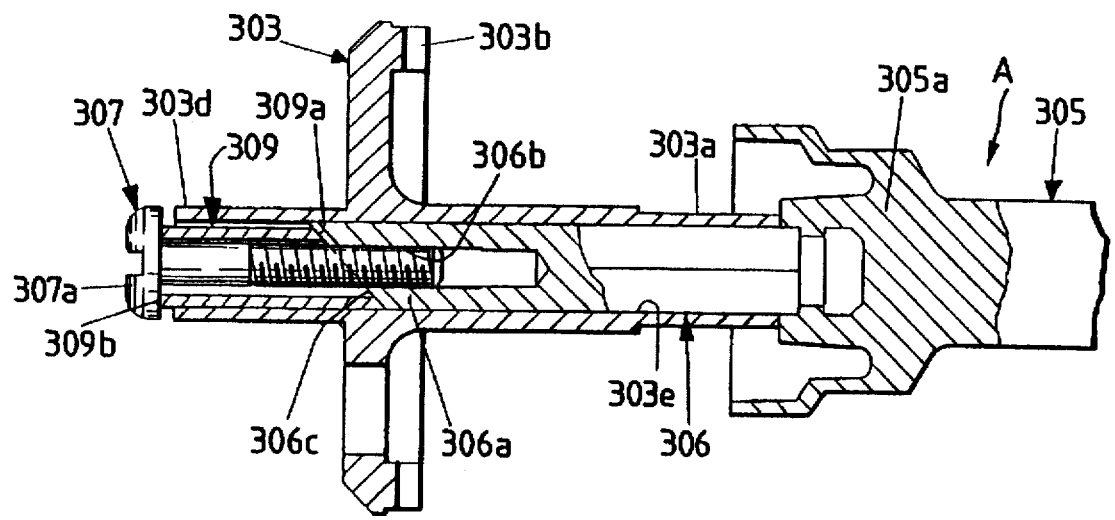
FIG. 29 is an enlarged sectional plane view of a handle mounting structure to which a ninth embodiment of the present invention is applied.

FIG. 29 shows a ninth embodiment of the present invention. In the ninth embodiment, the handle shaft 306 of the handle member A and the engagement member 309 are both inserted into the through-hole 303e of the cylindrical drive shaft 303a of the drive gear 303, and thereafter the threaded member 307 is tightened to the handle shaft 306. The other end portion 306a of the handle shaft 306 is formed with the slope surface 306c. The engagement member 309 is formed at its one end with an engagement portion 309a in the form of slope, and at its the other end with a perpendicular surface 309b, the perpendicular surface is projectingly disposed outside the cylindrical drive shaft 303a.

The head portion 307a of the threaded member 307 is larger in outer diameter than the cylindrical drive shaft 303a. The head portion 307a of the threaded member 307 may be formed to have a smaller diameter so as to be installed inside the cylindrical drive shaft 303a. However, in this case, when the threading engagement between the threaded member 307 and the threaded hole 306b of the handle shaft 306 is loosened, the handle shaft 306 is removed out of place. Therefore, it is preferable that the head portion 307a of the threaded member 307 is formed to have a larger outer diameter than that of the cylindrical drive shaft 303a as shown in FIG. 29 in order to surely prevent such undesirable removal of the handle shaft 306.

Figure 30:
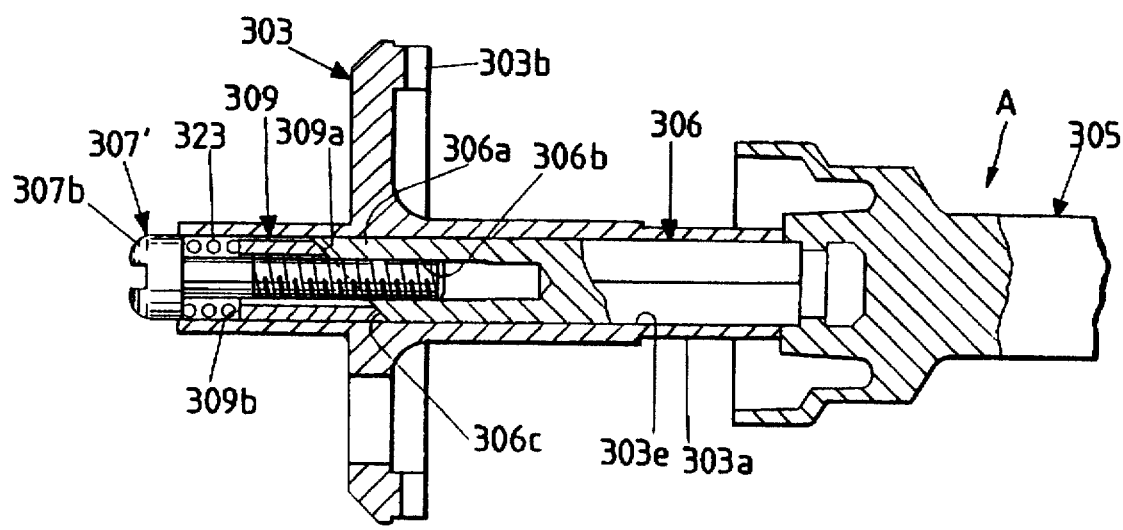
FIG. 30 is an enlarged sectional plane view of a handle mounting structure to which a tenth embodiment of the present invention is applied.

FIG. 30 shows a tenth embodiment of the present invention. In the tenth embodiment, the threaded member 307' is dimensioned such that the head portion 307b can be installed inside the cylindrical drive shaft 303a. In this embodiment, a spring 323 is interposed between the perpendicular surface 309b of the engagement member 309 and the inner end face of the head portion 307b of the threaded member 307'. The spring 323 can prevents the removal of the handle shaft 306 even when the threading engagement between the threaded member 307' and the threaded hole 306b of the handle shaft 306 is loosened. Other structure is similar to that of the ninth embodiment.

Figure 31:
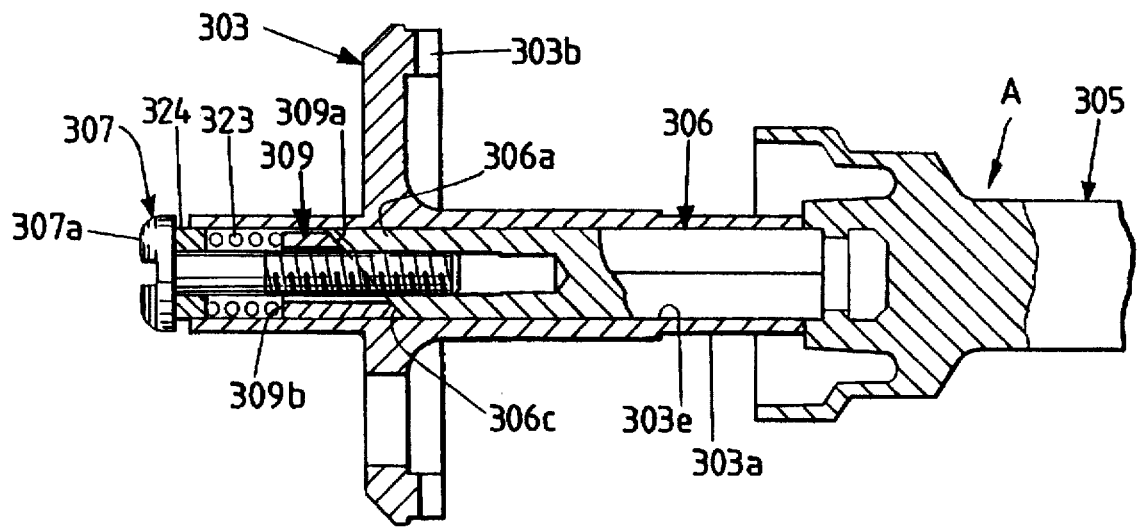
FIG. 31 is an enlarged sectional plane view of a handle mounting structure to which an eleventh embodiment of the present invention is applied.
Figure 32:
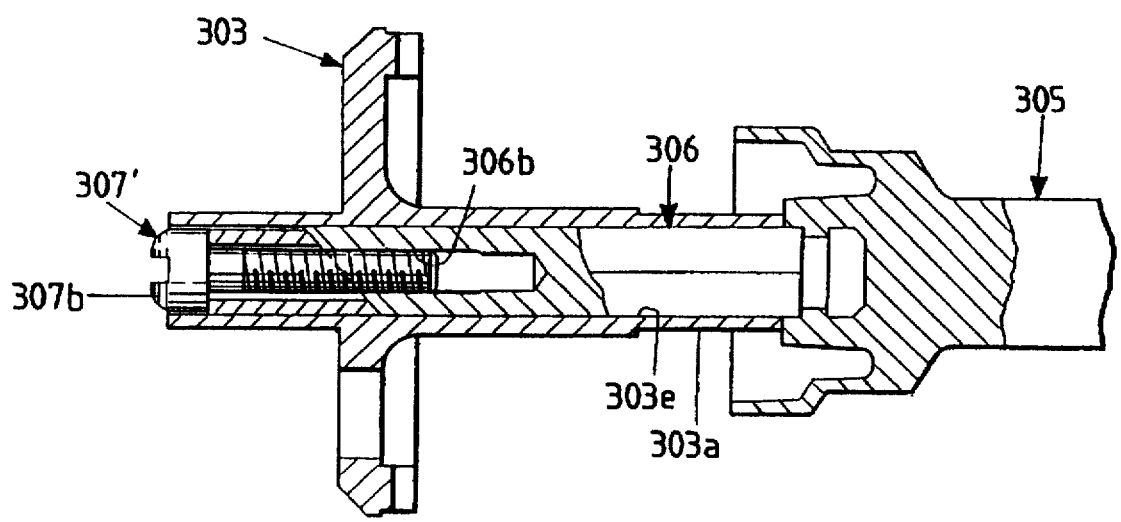
FIG. 32 is an enlarged sectional plane view of a modification of the structure shown in FIG. 29.

FIG. 31 shows an eleventh embodiment. In the eleventh embodiment, a collar 324 and a spring 323 are interposed between the perpendicular surface 309b of the engagement member 309 and the inner end face of the head portion 307a of the threaded member 307. Other structure is the same as that of the ninth embodiment.

According to the present invention, the handle shaft is displaced diametrically and brought into pressure-contact with the inner periphery of the through-hole of the cylindrical drive shaft by utilizing a slope surface guiding effect of the engagement portion in the form of the slope and the slope surface. Thus, it is possible to stably and surely remove the undesirable clearance or play in the circumference direction of the handle shaft to thereby prevent the clattering of the handle shaft.

What is claimed is:

1. A handle mounting structure in which a handle shaft is fittingly inserted into a through-hole of a cylindrical drive shaft longitudinally along a shaft axis, and a threaded member is threadingly engaged with the handle shaft so that the handle shaft is fixed to the cylindrical drive shaft, said structure comprising:

a first portion defining at least one inclined smooth surface circumscribing said shaft axis and uniformly tapered toward said shaft axis, said first portion translating longitudinally when said threaded member and said handle shaft are contractingly threaded; and a second portion defining an engaging surface, said engaging surface being forcibly brought into pressure-contact with said at least one inclined smooth surface when said threaded member and said handle shaft are contractingly threaded, said second portion being deformed radially outwardly as a consequence of said pressure-contact, and said second portion being radially interposed between said handle shaft and said cylindrical drive shaft, wherein said handle shaft evinces a polygonal outer surface and said through-hole of said cylindrical drive shaft evinces a polygonal inner surface, said handle shaft being rotationally interconnected with said cylindrical drive shaft through a mating of said polygonal outer surface and said polygonal inner surface, wherein said second portion extends longitudinally along only one planar surface of said polygonal inner surface.

2. The structure according to claim 1 wherein said first portion is formed on said handle shaft, and said second portion is formed on a collar which is arranged around a portion of said threaded member and located longitudinally between said first portion and a head portion of said threaded member.

3. The structure according to claim 2, wherein said collar includes a flange portion longitudinally held between said cylindrical drive shaft and said head portion of said threaded member.

4. The structure according to claim 1, wherein the first portion is formed at a tapered end of said handle shaft, and said engaging surface is forcibly brought into pressure-contact with said at least one inclined smooth surface of said tapered end when said threaded member and said handle shaft are contractingly threaded.

5. The structure according to claim 4, wherein said tapered end of said handle shaft evinces a polygonal cross section.

6. The structure according to claim 1, wherein the second portion is formed on a securing member, said securing member defining a polygonal cross section engaging said polygonal inner surface of the through-hole.

7. A handle mounting structure in which a handle shaft is fittingly inserted into a through-hole of a cylindrical drive shaft longitudinally, and a threaded member is threadingly engaged with the handle shaft so that the handle shaft is fixed to the cylindrical drive shaft, said structure comprising:

a first portion defining a first engaging surface of reduced diameter that circumscribes an axis of said handle shaft at an end thereof and advancing longitudinally when said threaded member and said handle shaft are contractingly threaded; and a second portion defining a second inclined smooth surface, said second inclined smooth surface being forcibly brought into pressure-contact with said first engaging surface when said threaded member and said handle shaft are contractingly threaded, said second portion being radially displaced with respect to said cylindrical drive shaft as a consequence of said pressure-contact, so that an outer periphery of said second portion is brought into pressure-contact with an inner periphery of said cylindrical drive shaft, wherein said handle shaft evinces a polygonal outer surface and said through-hole of said cylindrical drive shaft evinces a polygonal inner surface, said handle shaft being rotationally interconnected with said cylindrical drive shaft through a mating of said polygonal outer surface and said polygonal inner surface, and wherein said second portion projects longitudinally along only one planar surface of said polygonal inner surface.

8. The structure according to claim 7, wherein the first portion is formed at a tapered end of said handle shaft.

9. The structure according to claim 7, wherein the second portion is formed on a securing member, said securing member defining a polygonal cross section engaging said polygonal inner surface of the through-hole.

10. A handle mounting structure in a fishing reel, comprising:

a drive shaft having a drive gear and a through-hole defining a polygonal inner surface;

a handle shaft to which a handle is fixed, said handle shaft evincing a polygonal cross section, said handle shaft being non-rotatably fitted into said through-hole of said drive shaft, wherein said polygonal cross section of said handle shaft matingly engages said polygonal inner surface of said through-hole provided in the drive shaft;

at least one tapered engaging surface formed on an end portion of said handle shaft circumscribing an axis of said handle shaft;

a threaded member threadingly engageable with said handle shaft; and a securing member disposed on said threaded member, said securing member having a securing portion inserted and engaged between said at least one tapered engaging surface and said polygonal inner surface of said through-hole of said drive shaft, wherein said securing member projects longitudinally along only one planar surface of said polygonal inner surface.

11. The structure according to claim 10, wherein the securing member comprises a fitting portion having polygonal cross section which engages the polygonal inner surface of the through-hole.

* * * * *